United States Patent
Cho et al.

(10) Patent No.: US 12,164,334 B2
(45) Date of Patent: Dec. 10, 2024

(54) DISPLAY DEVICE AND ELECTRONIC DEVICE INCLUDING THE SAME

(71) Applicant: SAMSUNG DISPLAY CO., LTD., Yongin-si (KR)

(72) Inventors: Sungyeon Cho, Hwaseong-si (KR); Hoseok Son, Seoul (KR); Sungun Park, Suwon-si (KR); Jongin Baek, Hwaseong-si (KR); Kyung-Hwa Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 278 days.

(21) Appl. No.: 17/929,688

(22) Filed: Sep. 3, 2022

(65) Prior Publication Data

US 2023/0074833 A1    Mar. 9, 2023

(30) Foreign Application Priority Data

Sep. 6, 2021 (KR) .......................... 10-2021-0118400

(51) Int. Cl.
*G06F 1/16* (2006.01)
*G06F 3/044* (2006.01)

(52) U.S. Cl.
CPC .......... *G06F 1/1643* (2013.01); *G06F 1/1616* (2013.01); *G06F 1/1652* (2013.01); *G06F 3/0446* (2019.05)

(58) Field of Classification Search
CPC .... G06F 1/1643; G06F 1/1616; G06F 1/1652; G06F 3/0446; G06F 2203/04106; G06F 3/0412; G06F 2203/04102; G06F 3/046; G06F 1/1641; G06F 3/0416; G06F 3/1431; G06F 2203/04111
See application file for complete search history.

(56) References Cited

U.S. PATENT DOCUMENTS

| 9,678,604 | B2 | 6/2017 | Lee | |
| 10,976,873 | B2 | 4/2021 | Shin et al. | |
| 2010/0110021 | A1* | 5/2010 | Chiu | G06F 3/046 |
| | | | | 345/173 |
| 2016/0269720 | A1* | 9/2016 | Patel | H04N 13/344 |
| 2019/0212851 | A1* | 7/2019 | Lee | G06F 3/0412 |
| 2020/0209998 | A1* | 7/2020 | Shin | G06F 3/044 |
| 2021/0173437 | A1* | 6/2021 | Bae | H10K 59/40 |

(Continued)

FOREIGN PATENT DOCUMENTS

| KR | 10-1750564 | 6/2017 |
| KR | 10-2019-0064877 | 6/2019 |
| KR | 10-2020-0084495 | 7/2020 |

(Continued)

*Primary Examiner* — Antonio Xavier
(74) *Attorney, Agent, or Firm* — F. CHAU & ASSOCIATES, LLC

(57) ABSTRACT

A display device includes a display panel, a main digitizer and a sub-digitizer disposed behind the display panel. A main flexible circuit board is disposed on a rear surface of the main digitizer and is connected to the main digitizer. A sub-flexible circuit board disposed on a rear surface of the sub-digitizer and connected to the sub-digitizer. A bridge flexible circuit board disposed on the rear surface of the main digitizer and the rear surface of the sub-digitizer and connected to the main flexible circuit board and the sub-flexible circuit board.

20 Claims, 21 Drawing Sheets

(56) References Cited

U.S. PATENT DOCUMENTS

2022/0165826 A1    6/2022  An et al.

FOREIGN PATENT DOCUMENTS

| KR | 10-2020-01011    | 8/2020  |
| KR | 10-2020-0124099  | 11/2020 |
| KR | 10-2021-0092643  | 7/2021  |
| KR | 10-2021-0102044  | 8/2021  |

* cited by examiner

DISPLAY DEVICE AND ELECTRONIC DEVICE INCLUDING THE SAME

CROSS-REFERENCE TO RELATED APPLICATIONS

This application claims priority under 35 U.S.C. § 119 to Korean Patent Application No. 10-2021-0118400 filed on Sep. 6, 2021, in the Korean Intellectual Property Office, the disclosure of which is incorporated by reference herein in its entirety.

TECHNICAL FIELD

The present disclosure relates to a display and, more specifically, to a display device and an electronic device including the display device.

DISCUSSION OF THE RELATED ART

Electronic devices, such as a smart phone, a digital camera, a notebook computer, a navigation device, a smart television, and the like, which provide an image to a user, include a display device for displaying an image. The display device generates an image and provides the image to the user through a display screen.

Recently, display devices have been designed to have various forms. For example, flexible display devices that can be curved, folded, or rolled have been developed. Flexible display devices may be easy to carry and may still provide a large display area.

Among the flexible display devices, a foldable display device may be folded about a folding axis. The foldable display device may include a display module that is folded about the folding axis and a support that is disposed under/behind the display module and supports the display module. The support may be folded together with the display module. The foldable display device may further include a digitizer disposed under/behind the display module. The digitizer may be divided so as not to overlap a folding area of the display module and may be disposed under separate non-folding areas of the display module.

SUMMARY

A display device includes a display panel, a main digitizer and a sub-digitizer disposed under the display panel and arranged in one direction. A main flexible circuit board is disposed on a rear surface of the main digitizer and is connected to the main digitizer. A sub-flexible circuit board is disposed on a rear surface of the sub-digitizer and is connected to the sub-digitizer. A bridge flexible circuit board is disposed on the rear surface of the main digitizer and the rear surface of the sub-digitizer and is connected to the main flexible circuit board and the sub-flexible circuit board.

A display device includes a display panel including a first non-folding area, a second non-folding area, and a folding area disposed between the first and second non-folding areas. A first digitizer is disposed under the first non-folding area. A second digitizer is disposed under the second non-folding area. A bridge flexible circuit board is connected to the first and second digitizers. Each of the first and second digitizers includes a plurality of X-axis electrodes and a plurality of Y-axis electrodes that insulatively cross each other. The X-axis electrodes of the second digitizer are connected to the X-axis electrodes of the first digitizer through the bridge flexible circuit board.

An electronic device includes a display device having a first hole area defined therein through which an optical signal passes, an electro-optical module that is disposed under the display device and that overlaps the first hole area and receives the optical signal, and a case that accommodates the display device and the electro-optical module. The display device includes a display panel, a main digitizer and a sub-digitizer disposed under the display panel and arranged in one direction. A main flexible circuit board is disposed on a rear surface of the main digitizer and is connected to the main digitizer. A sub-flexible circuit board is disposed on a rear surface of the sub-digitizer and is connected to the sub-digitizer. A bridge flexible circuit board is disposed on the rear surface of the main digitizer and the rear surface of the sub-digitizer and is connected to the main flexible circuit board and the sub-flexible circuit board.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
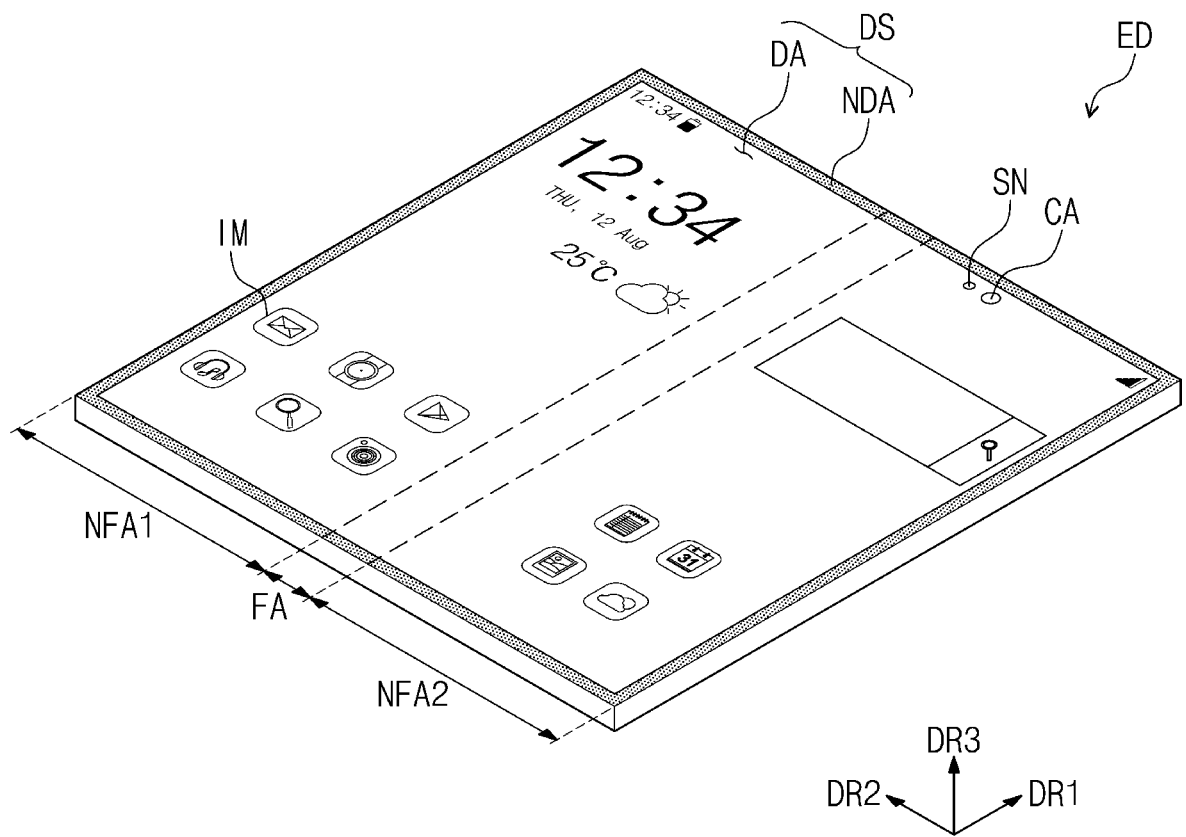
FIG. 1 is a perspective view of an electronic device according to an embodiment of the present disclosure.

In this specification, when it is mentioned that a component (or, an area, a layer, a part, etc.) is referred to as being "on", "connected to" or "coupled to" another component, this means that the component may be directly on, connected to, or coupled to the other component or a third component may be present therebetween.

Identical reference numerals refer to identical components throughout the specification and the figures. Additionally, in the drawings, the thicknesses, proportions, and dimensions of components may be exaggerated for effective description. However, it is to be understood that the thicknesses, proportions and dimensions of the components in the diagrams can be taken as an example embodiment and so these illustrations are intended to form part of the disclosure.

As used herein, the term "and/or" includes all of one or more combinations defined by related components.

Terms such as first, second, and the like may be used to describe various components, but the components should not necessarily be limited by the terms. The terms may be used for distinguishing one component from other components. For example, without departing the scope of the present disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Hereinafter, embodiments of the present disclosure will be described with reference to the accompanying drawings.

Figure 2:
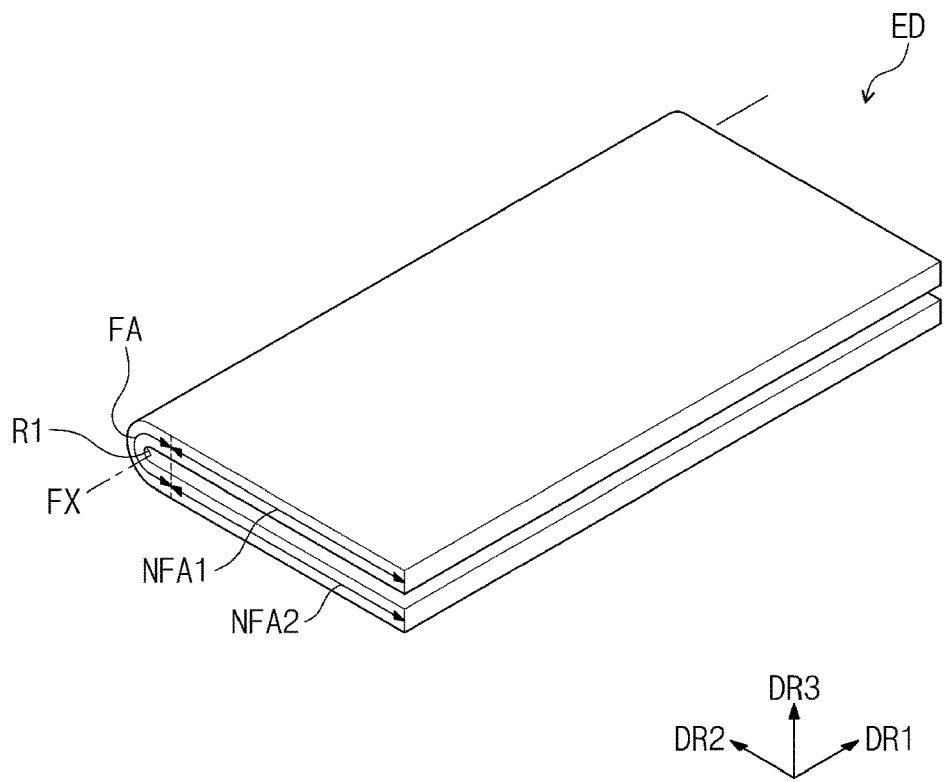
FIGS. 2 and 3 are perspective views illustrating folded states of the electronic device illustrated in FIG. 1.
Figure 3:
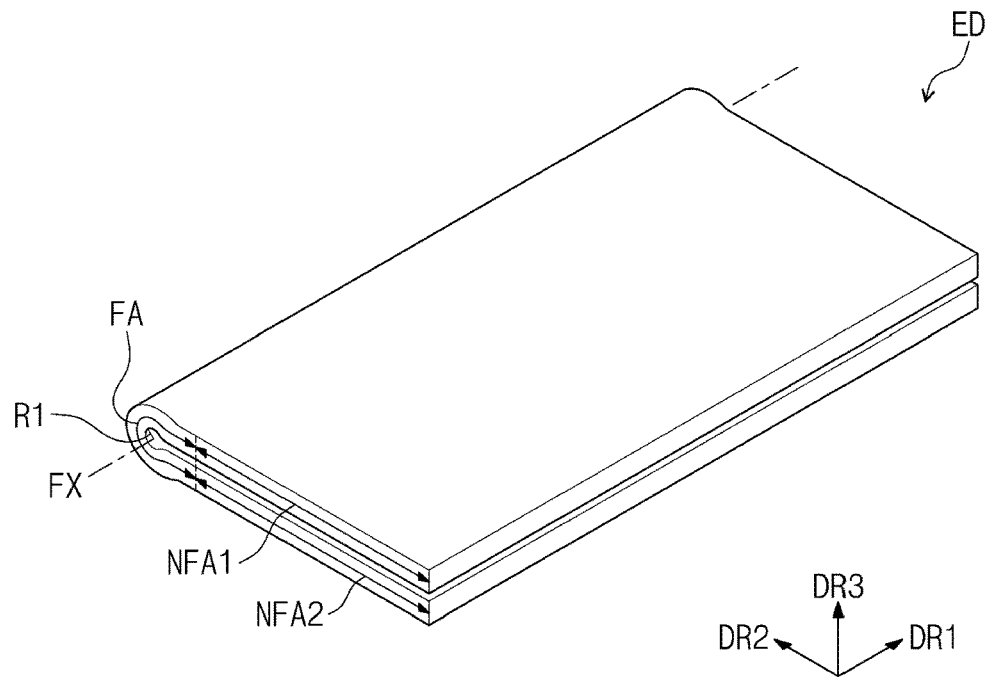

FIG. 1 is a perspective view of an electronic device according to an embodiment of the present disclosure. FIGS. 2 and 3 are perspective views illustrating folded states of the electronic device illustrated in FIG. 1.

Referring to FIG. 1, the electronic device ED, according to an embodiment of the present disclosure, may have a substantially rectangular shape with a pair of long sides extending in a first direction DR1 and a pair of short sides extending in a second direction DR2 crossing the first direction DR1. However, the electronic device ED may have various other shapes such as a circular shape, a polygonal shape, and the like. The electronic device ED may be a flexible display device.

Hereinafter, a direction substantially vertically crossing a plane defined by the first direction DR1 and the second direction DR2 is defined as a third direction DR3 Furthermore, the expression "when viewed on the plane" or "in a plan view" used herein may be defined as a state viewed in the third direction DR3 or in a direction opposite to the third direction DR3.

The electronic device ED may include a folding area FA and a plurality of non-folding areas NFA1 and NFA2. The non-folding areas NFA1 and NFA2 may include the first non-folding area NFA1 and the second non-folding area NFA2. The folding area FA may be disposed between the first non-folding area NFA1 and the second non-folding area NFA2. The folding area FA, the first non-folding area NFA1, and the second non-folding area NFA2 may be arranged in the second direction DR2.

Although one folding area FA and two non-folding areas NFA1 and NFA2 are illustrated, the number of folding areas FA and the number of non-folding areas NFA1 and NFA2 are not necessarily limited thereto. For example, the electronic device ED may include more than two non-folding areas and a plurality of folding areas disposed between the non-folding areas.

An upper surface of the electronic device ED may be defined as a display surface DS, and the display surface DS may have a plane defined by the first direction DR1 and the second direction DR2. Images IM generated by the electronic device ED may be provided to a user through the display surface DS.

The display surface DS may include a display area DA and a non-display area NDA adjacent to the display area DA. The display area DA may display an image, and the non-display area NDA might not display an image. The non-display area NDA may at least partially surround the display area DA and may define a border of the electronic device ED that is printed in a predetermined color.

The electronic device ED may include at least one sensor SN and at least one camera CA. The sensor SN and the camera CA may be adjacent to the border of the electronic device ED. The sensor SN and the camera CA may be disposed in the display area DA adjacent to the non-display area NDA. The sensor SN and the camera CA may be disposed in the second non-folding area NFA2. However, without necessarily being limited thereto, the sensor SN and the camera CA may be disposed in the first non-folding area NFA1.

Light may transmit through the portions of the electronic device ED in which the sensor SN and the camera CA are disposed and may be provided to the camera CA and the sensor SN. For example, the sensor SN may be a proximity illuminance sensor. However, the type of the sensor SN is not necessarily limited thereto. The camera CA may take an external image. A plurality of sensors SN and a plurality of cameras CA may be provided.

Referring to FIGS. 2 and 3, the electronic device ED may be a foldable electronic device ED that may be placed into a folded state or an unfolded state. For example, the folding area FA may be bent about a folding axis FX that is parallel to the first direction DR1, and the electronic device ED may be folded accordingly. The folding axis FX may be defined as a long axis parallel to the long sides of the electronic device ED.

When the electronic device ED is folded, the first non-folding area NFA1 and the second non-folding area NFA2 may face each other, and the electronic device ED may be folded in an in-folding manner such that the display surface DS is protected and not exposed to the outside when in the folded state. However, the present disclosure is not necessarily limited thereto. For example, the electronic device ED may be folded about the folding axis FX in an out-folding manner such that the display surface DS remains viewable and is exposed to the outside when in the folded state.

As illustrated in FIG. 2, the distance between the first non-folding area NFA1 and the second non-folding area NFA2 may be substantially the same as the radius of curvature R1. However, without necessarily being limited thereto, as illustrated in FIG. 3, the distance between the first non-folding area NFA1 and the second non-folding area NFA2 may be smaller than the radius of curvature R1.

Figure 4:
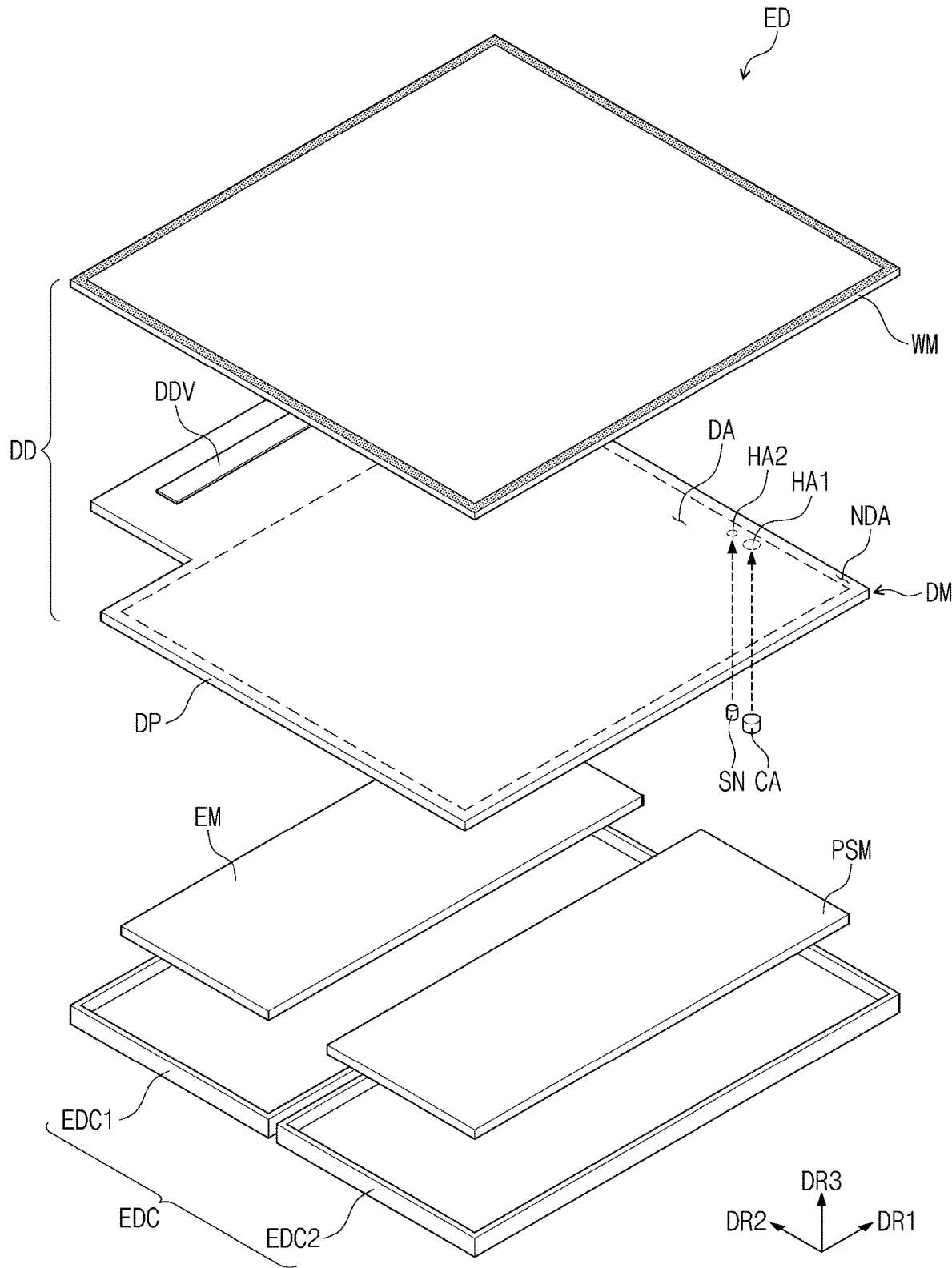
FIG. 4 is an exploded perspective view of the electronic device illustrated in FIG. 1.

FIG. 4 is an exploded perspective view of the electronic device illustrated in FIG. 1.

Referring to FIG. 4, the electronic device ED may include a display device DD, the camera CA, the sensor SN, an electronic module EM, a power supply module PSM, and a case EDC. The electronic device ED may further include a mechanical structure (e.g., a hinge) for controlling a folding motion of the display device DD.

The display device DD may generate an image and may sense an external input. The display device DD may include a window module WM and a display module DM. The window module WM may provide a front side of the electronic device ED. The window module WM may be disposed over the display module DM and may protect the display module DM. The window module WM may be transparent and may therefore pass light generated from the display module DM and may provide the light to the user.

The display module DM may include at least a display panel DP. Although only the display panel DP among stacked structures of the display module DM is illustrated in FIG. 4, the display module DM may further include a plurality of components disposed over and/or under the display panel DP. A stack structure of the display module DM will be described below in detail. The display panel DP may include a display area DA and a non-display area NDA that correspond to the display area DA (refer to FIG. 1) and the non-display area NDA (refer to FIG. 1) of the electronic device ED.

A first hole area HA1 and a second hole area HA2 may be defined in the display panel DP. The first hole area HA1 and the second hole area HA2 may have a higher light transmittance than the surrounding area of the display module DM. The camera CA may be disposed under the first hole area HAL and the sensor SN may be disposed under the second hole area HA2. Light passing through the first and second hole areas HA1 and HA2 may be provided to the camera CA and the sensor SN.

The display module DM may include a data driver DDV disposed on the non-display area NDA of the display panel DP. The data driver DDV may be manufactured in the form of an integrated circuit chip and may be mounted on the non-display area NDA. However, without necessarily being limited thereto, the data driver DDV may be mounted on a flexible circuit board connected to the display panel DP.

The electronic module EM and the power supply module PSM may be disposed under the display device DD. The electronic module EM and the power supply module PSM may be connected to each other through a separate flexible circuit board. The electronic module EM may control operation of the display device DD. The power supply module PSM may supply power to the electronic module EM.

The case EDC may accommodate the display device DD, the electronic module EM, and the power supply module PSM. To allow the display device DD to fold, the case EDC may include a first case EDC1 and a second case EDC2. The first case EDC1 and the second case EDC2 may extend in the first direction DR1 and may be arranged in the second direction DR2.

The electronic device ED may further include a hinge structure for connecting the first case EDC1 and the second case EDC2. The case EDC may be coupled with the window module WM. The case EDC may protect the display device DD, the electronic module EM, and the power supply module PSM from damage.

Figure 5:
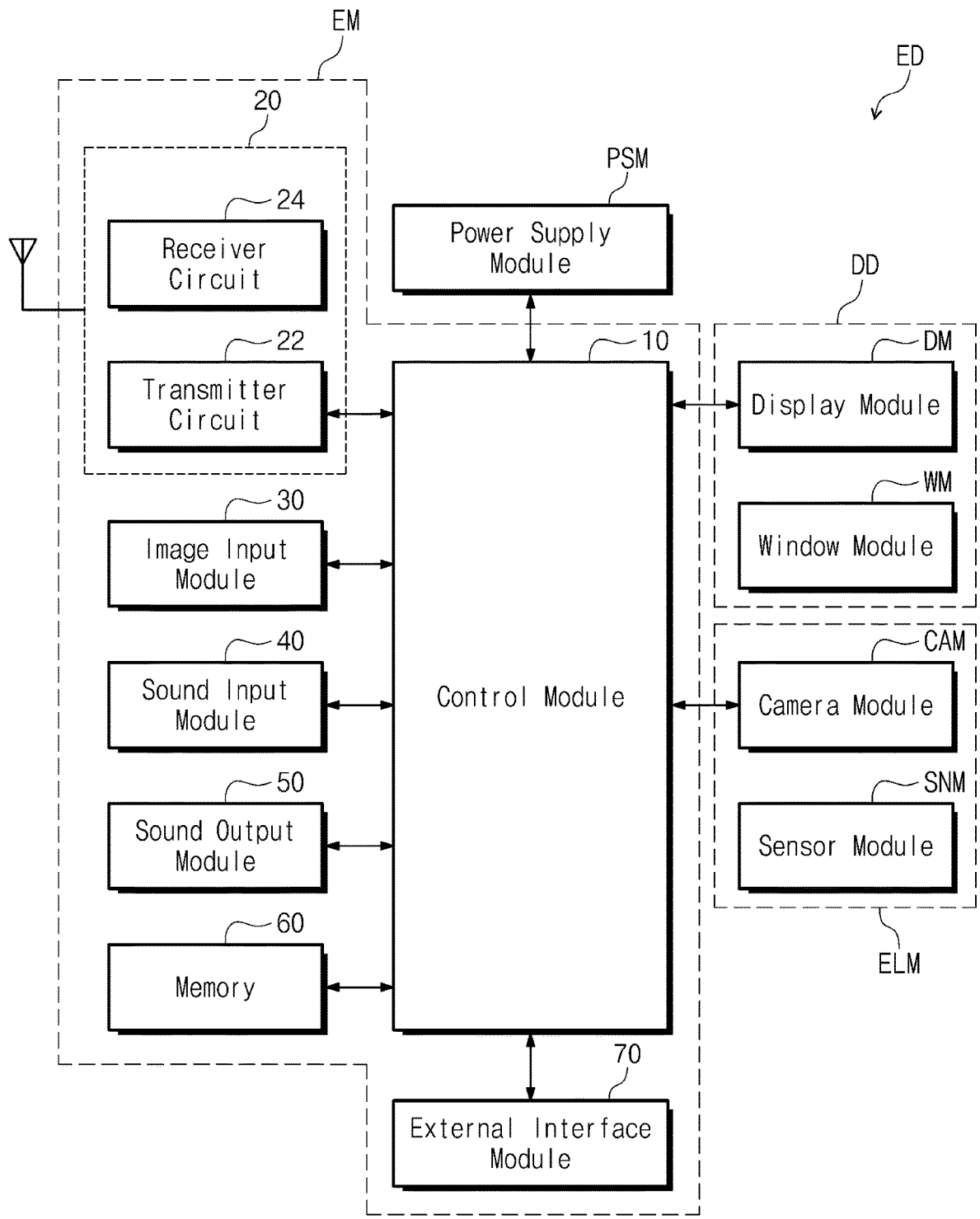
FIG. 5 is a block diagram of the electronic device illustrated in FIG. 4.

FIG. 5 is a block diagram of the electronic device illustrated in FIG. 4.

Referring to FIG. 5, the electronic device ED may include the electronic module EM, the power supply module PSM, the display device DD, and an electro-optical module ELM. The electronic module EM may include a control module 10, a wireless communication module 20, an image input module 30, a sound input module 40, a sound output module 50, a memory 60, an external interface module 70, and the like. The modules may be mounted on a circuit board or may be electrically connected through a flexible circuit board. The electronic module EM may be electrically connected with the power supply module PSM.

The control module 10 may control an overall operation of the electronic device ED. For example, the control module 10 may activate or deactivate the display device DD in response to a user input. The control module 10 may control the image input module 30, the sound input module 40, and the sound output module 50 in response to a user input. The control module 10 may include at least one microprocessor.

The wireless communication module 20 may transmit/receive wireless signals with another terminal through Bluetooth or Wi-Fi. The wireless communication module 20 may transmit/receive sound signals using a general communication line. The wireless communication module 20 may include a transmitter circuit 22 that modulates a signal to be transmitted and transmits the modulated signal and a receiver circuit 24 that demodulates a received signal.

The image input module 30 may process an image signal and may convert the image signal into image data that can be displayed on the display device DD. The sound input module 40 may receive an external sound signal through a microphone in a voice recording mode or a voice recognition mode and may convert the external sound signal into electrical voice data. The sound output module 50 may convert sound data received from the wireless communication module 20 or sound data stored in the memory 60 and may output the converted data to the outside.

The external interface module 70 may serve as an interface connected to an external charger, a wired/wireless data port, a card socket (e.g., a memory card or a SIM/UIM card), or the like.

The power supply module PSM may supply power required for overall operation of the electronic device ED. The power supply module PSM may include a battery device.

The electro-optical module ELM may be an electronic part that outputs or receives an optical signal. The electro-optical module ELM may transmit or receive an optical signal through a partial area of the display device DD. In this embodiment, the electro-optical module ELM may include a camera module CAM and a sensor module SNM. The camera module CAM may include the camera CA illustrated in FIG. 4. The sensor module SNM may include the sensor SN illustrated in FIG. 4.

Figure 6:
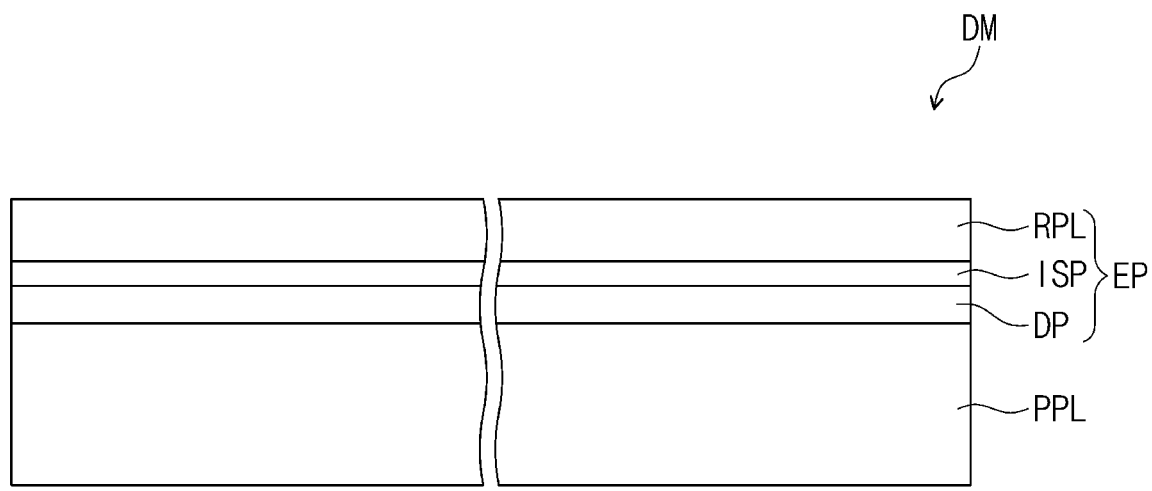
FIG. 6 is a schematic cross-sectional view of a display module illustrated in FIG. 4.
Figure 6:
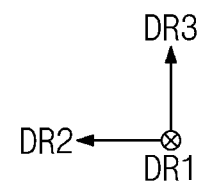

FIG. 6 is a schematic cross-sectional view of the display module illustrated in FIG. 4.

Referring to FIG. 6, the display module DM may include an electronic panel EP and a panel protection layer PPL disposed under the electronic panel EP. The electronic panel EP may include the display panel DP, an input sensing part ISP disposed on the display panel DP, and an anti-reflection layer RPL disposed on the input sensing part ISP. The display panel DP may be a flexible display panel. For example, the display panel DP may include a flexible substrate and a plurality of elements disposed on the flexible substrate.

The display panel DP, according to an embodiment of the present disclosure, may be an emissive display panel that is capable of generating its own light, but is not necessarily limited to such a display panel and may utilize a backlight. However, when the display panel DP is an emissive display panel, the display panel DP may be an organic light emitting display panel or an inorganic light emitting display panel. An emissive layer of the organic light emitting display panel may contain an organic light emitting material. An emissive layer of the inorganic light emitting display panel may contain quantum dots, quantum rods, and the like. Hereinafter, it will be exemplified that the display panel DP is an organic light emitting display panel.

The input sensing part ISP may include a plurality of sensors for sensing an external input, for example, in a capacitive manner. The input sensing part ISP may be directly formed on the display panel DP when the display module DM is manufactured.

The anti-reflection layer RPL may be disposed on the input sensing part ISP. The anti-reflection layer RPL may be directly formed on the input sensing part ISP when the display module DM is manufactured. The anti-reflection layer RPL may be defined as a film for preventing reflection of external light. The anti-reflection layer RPL may decrease the reflectivity of external light incident toward the display panel DP from above the display device DD.

For example, the input sensing part ISP may be directly formed on the display panel DP, and the anti-reflection layer RPL may be directly formed on the input sensing part ISP. However, the present disclosure is not necessarily limited thereto. For example, the input sensing part ISP may be separately manufactured and may be attached to the display panel DP by an adhesive layer, and the anti-reflection layer RPL may be separately manufactured and may be attached to the input sensing part ISP by an adhesive layer.

The panel protection layer PPL may be disposed under the display panel DP. The panel protection layer PPL may protect a lower portion of the display panel DP. The panel protection layer PPL may contain a flexible plastic material. For example, the panel protection layer PPL may contain polyethylene terephthalate (PET).

Figure 7:
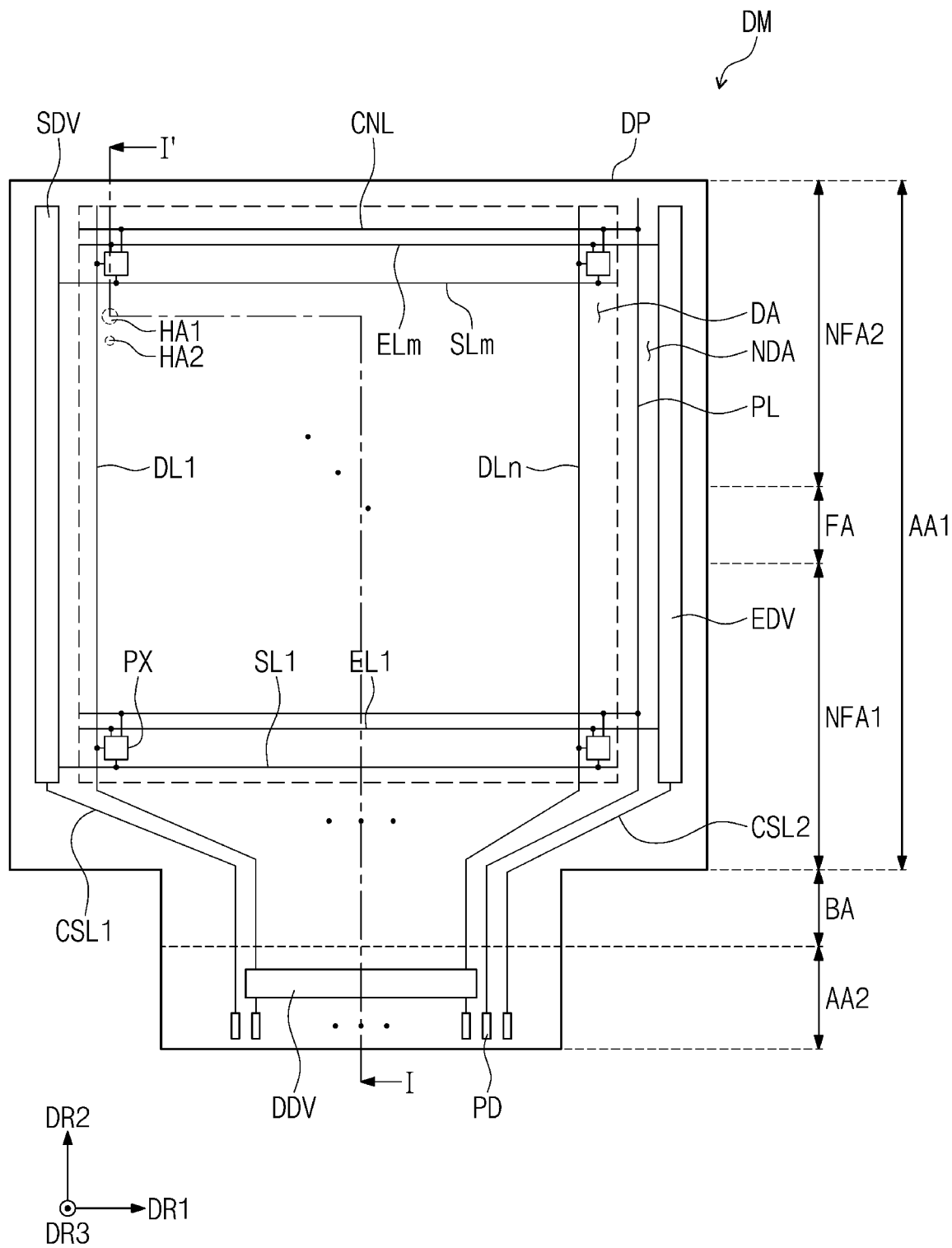
FIG. 7 is a plan view of a display panel illustrated in FIG. 4.

FIG. 7 is a plan view of the display panel illustrated in FIG. 4.

Referring to FIG. 7, the display module DM may include the display panel DP, a scan driver SDV, the data driver DDV, and an emission driver EDV.

The display panel DP may include a first area AA1, a second area AA2, and a bending area BA between the first area AA1 and the second area AA2. The bending area BA may extend in the first direction DR1, and the first area AA1, the bending area BA, and the second area AA2 may be arranged in the second direction DR2.

The first area AA1 may include a display area DA and a non-display area NDA adjacent to the display area DA. The non-display area NDA may at least partially surround the display area DA. The display area DA may be an area that displays an image, and the non-display area NDA may be an area that does not display an image. The second area AA2 and the bending area BA may be areas that do not display an image.

The first area AA1, when viewed in the first direction DR1, may include a first non-folding area NFA1, a second non-folding area NFA2, and a folding area FA between the first non-folding area NFA1 and the second non-folding area NFA2. The above-described first and second hole areas HA1 and HA2 may be defined in the display area DA and the second non-folding area NFA2.

The display panel DP may include a plurality of pixels PX, a plurality of scan lines SL1 to SLm, a plurality of data lines DL1 to DLn, a plurality of emission lines EL1 to ELm, first and second control lines CSL1 and CSL2, a power line PL, a plurality of connecting lines CNL, and a plurality of pads PD. As used herein, "m" and "n" are natural numbers. The pixels PX may be disposed on the display area DA and may be connected to the scan lines SL1 to SLm, the data lines DL1 to DLn, and the emission lines EL1 to ELm.

The scan driver SDV and the emission driver EDV may be disposed on the non-display area NDA. The scan driver SDV and the emission driver EDV may be disposed on the non-display areas NDA adjacent to opposite sides of the first area AA1 that face away from each other in the first direction DR1. The data driver DDV may be disposed on the second area AA2. The data driver DDV may be manufactured in the form of an integrated circuit chip and may be mounted on the second area AA2.

The scan lines SL1 to SLm may extend in the first direction DR1 and may be connected to the scan driver SDV. The data lines DL1 to DLn may extend in the second direction DR2 and may be connected to the data driver DDV via the bending area BA. The emission lines EL1 to ELm may extend in the first direction DR1 and may be connected to the emission driver EDV.

The power line PL may extend in the second direction DR2 and may be disposed on the non-display area NDA. The power line PL may be disposed between the display area DA and the emission driver EDV. However, without necessarily being limited thereto, the power line PL may be disposed between the display area DA and the scan driver SDV.

The power line PL may extend to the second area AA2 via the bending area BA. The power line PL may extend toward a lower end of the second area AA2 when viewed on the plane. The power line PL may receive a driving voltage.

The connecting lines CNL may extend in the first direction DR1 and may be arranged in the second direction DR2. The connecting lines CNL may be connected to the power line PL and the pixels PX. The driving voltage may be applied to the pixels PX through the power line PL and the connecting lines CNL connected together.

The first control line CSL1 may be connected to the scan driver SDV and may extend toward the lower end of the second area AA2 via the bending area BA. The second control line CSL2 may be connected to the emission driver EDV and may extend toward the lower end of the second area AA2 via the bending area BA. The data driver DDV may be disposed between the first control line CSL1 and the second control line CSL2.

The pads PD may be disposed adjacent to the lower end of the second area AA2 when viewed on the plane. The data driver DDV, the power line PL, the first control line CSL1, and the second control line CSL2 may be connected to the pads PD.

The data lines DL1 to DLn may be connected to the corresponding pads PD through the data driver DDV. For example, the data lines DL1 to DLn may be connected to the data driver DDV, and the data driver DDV may be connected to the pads PD corresponding to the data lines DL1 to DLn.

A printed circuit board may be connected to the pads PD, and a timing controller and a voltage generator may be disposed on the printed circuit board. The timing controller may be manufactured in the form of an integrated circuit chip and may be mounted on the printed circuit board. The timing controller and the voltage generator may be connected to the pads PD through the printed circuit board.

The timing controller may control operations of the scan driver SDV, the data driver DDV, and the emission driver EDV. The timing controller may generate a scan control signal, a data control signal, and an emission control signal in response to control signals received from an external source. The voltage generator may generate the driving voltage.

The scan control signal may be provided to the scan driver SDV through the first control line CSL1. The emission control signal may be provided to the emission driver EDV through the second control line CSL2. The data control signal may be provided to the data driver DDV. The timing controller may receive image signals from an external source, may convert the data format of the image signals according to the specification of an interface with the data driver DDV and may provide the converted signals to the data driver DDV.

The scan driver SDV may generate a plurality of scan signals in response to the scan control signal. The scan signals may be applied to the pixels PX through the scan lines SL1 to SLm. The scan signals may be sequentially applied to the pixels PX.

The data driver DDV may generate a plurality of data voltages corresponding to the image signals in response to the data control signal. The data voltages may be applied to the pixels PX through the data lines DL1 to DLn. The emission driver EDV may generate a plurality of emission signals in response to the emission control signal. The emission signals may be applied to the pixels PX through the emission lines EL1 to ELm.

The pixels PX may receive the data voltages in response to the scan signals. The pixels PX may display an image by emitting light having luminance corresponding to the data voltages in response to the emission signals. Emission time of the pixels PX may be controlled by the emission signals.

Figure 8:
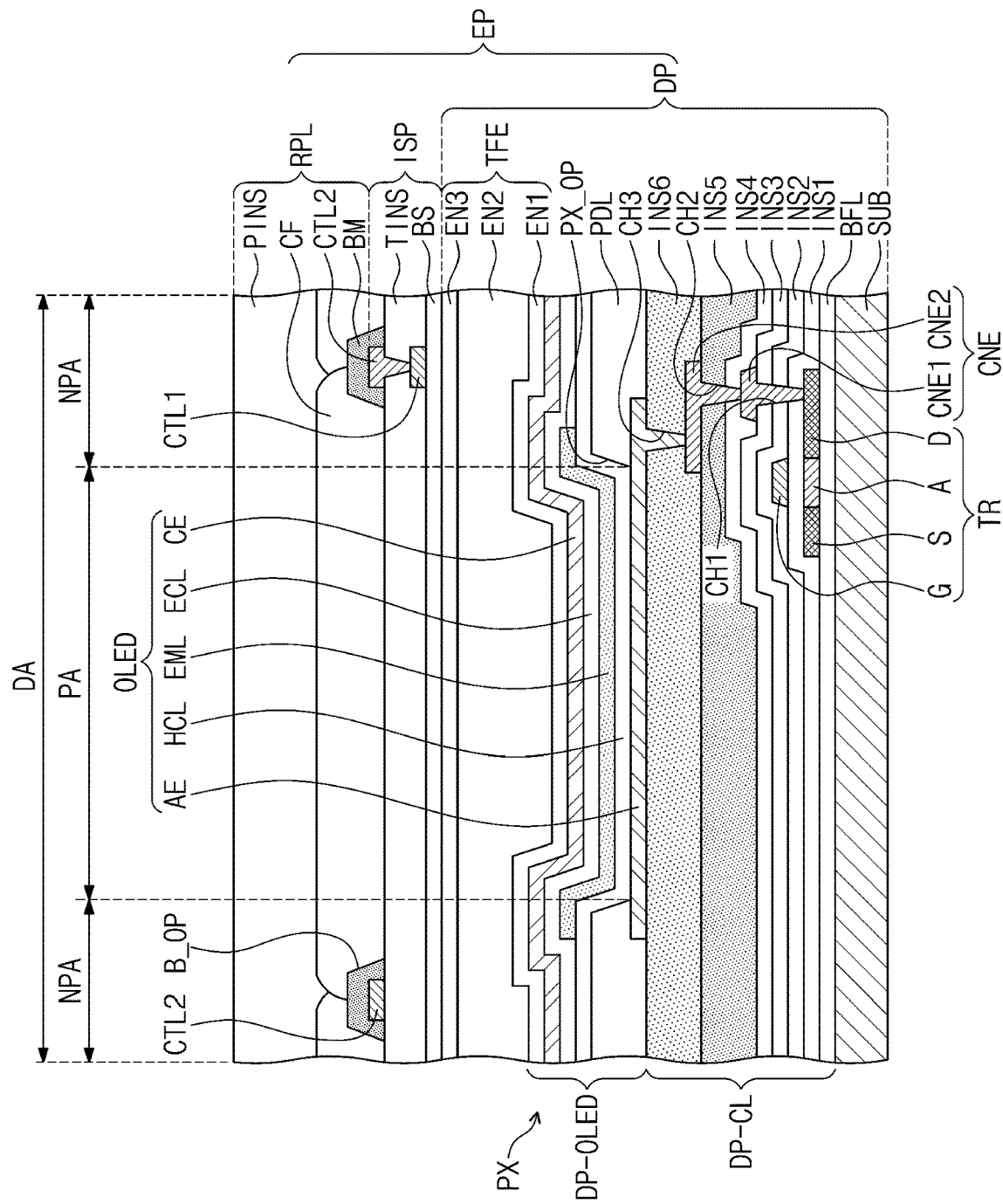
FIG. 8 is a cross-sectional view illustrating a portion of an electronic panel corresponding to any one pixel illustrated in FIG. 7.

FIG. 8 is a cross-sectional view illustrating a portion of the electronic panel corresponding to any one pixel illustrated in FIG. 7.

Referring to FIG. 8, the pixel PX may include a transistor TR and a light emitting element OLED. The light emitting element OLED may include a first electrode (or, an anode) AE, a second electrode (or, a cathode) CE, a hole control layer HCL, an electron control layer ECL, and an emissive layer EML.

The transistor TR and the light emitting element OLED may be disposed on a substrate SUB. Although one transistor TR is illustrated, the pixel PX may substantially include a plurality of transistors and at least one capacitor for driving the light emitting element OLED.

The display area DA may include an emissive area PA corresponding to each of the pixels PX and a non-emissive area NPA adjacent to the emissive area PA. The light emitting element OLED may be disposed in the emissive area PA.

A buffer layer BFL may be disposed on the substrate SUB. The buffer layer BFL may be an inorganic layer. A semiconductor pattern may be disposed on the buffer layer BFL. The semiconductor pattern may contain poly silicon, amorphous silicon, or metal oxide.

The semiconductor pattern may be doped with an N-type dopant or a P-type dopant. The semiconductor pattern may include a heavily doped area and a lightly doped area. The conductivity of the heavily doped area may be higher than the conductivity of the lightly doped area, and the heavily doped area may substantially serve as a source electrode and a drain electrode of the transistor TR. The lightly doped area may substantially correspond to an active (or, channel) area of the transistor TR.

A source S, an active area A, and a drain D of the transistor TR may be formed from the semiconductor pattern. A first insulating layer INS1 may be disposed on the semiconductor pattern. A gate G of the transistor TR may be disposed on the first insulating layer INS1. A second insulating layer INS2 may be disposed on the gate G. A third insulating layer INS3 may be disposed on the second insulating layer INS2.

To connect the transistor TR and the light emitting element OLED, a connecting electrode CNE may include a first connecting electrode CNE1 and a second connecting electrode CNE2. The first connecting electrode CNE1 may be disposed on the third insulating layer INS3 and may be connected to the drain D through a first contact hole CH1 defined in the first, second, and third insulating layers INS1, INS2, and INS3.

A fourth insulating layer INS4 may be disposed on the first connecting electrode CNE1. A fifth insulating layer INS5 may be disposed on the fourth insulating layer INS4. The second connecting electrode CNE2 may be disposed on the fifth insulating layer INS5. The second connecting electrode CNE2 may be connected to the first connecting electrode CNE1 through a second contact hole CH2 defined in the fourth and fifth insulating layers INS4 and INS5.

A sixth insulating layer INS6 may be disposed on the second connecting electrode CNE2. The layers from the buffer layer BFL to the sixth insulating layer INS6 may be defined as a circuit element layer DP-CL. The first to sixth insulating layers INS1 to INS6 may be inorganic layers or organic layers.

The first electrode AE may be disposed on the sixth insulating layer INS6. The first electrode AE may be connected to the second connecting electrode CNE2 through a third contact hole CH3 defined in the sixth insulating layer INS6. A pixel defining film PDL having an opening PX_OP defined therein for exposing a predetermined portion of the first electrode AE may be disposed on the first electrode AE and the sixth insulating layer INS6.

The hole control layer HCL may be disposed on the first electrode AE and the pixel defining film PDL. The hole control layer HCL may include a hole transporting layer and a hole injection layer.

The emissive layer EML may be disposed on the hole control layer HCL. The emissive layer EML may be disposed in an area corresponding to the opening PX_OP. The emissive layer EML may contain an organic material and/or an inorganic material. The emissive layer EML may generate red light, green light, or blue light.

The electron control layer ECL may be disposed on the emissive layer EML and the hole control layer HCL. The electron control layer ECL may include an electron transporting layer and an electron injection layer. The hole control layer HCL and the electron control layer ECL may be commonly disposed in the emissive area PA and the non-emissive area NPA.

The second electrode CE may be disposed on the electron control layer ECL. The second electrode CE may be commonly disposed on the pixels PX. The layer having the light emitting element OLED disposed therein may be defined as a display element layer DP-OLED.

A thin-film encapsulation layer TFE may be disposed on the second electrode CE and may cover the pixel PX. The thin-film encapsulation layer TFE may include a first encapsulation layer EN1 disposed on the second electrode CE, a second encapsulation layer EN2 disposed on the first encapsulation layer EN1, and a third encapsulation layer EN3 disposed on the second encapsulation layer EN2.

The first and third encapsulation layers EN1 and EN3 may include inorganic insulating layers and may protect the pixel PX from moisture/oxygen. The second encapsulation layer EN2 may include an organic insulating layer and may protect the pixel PX from foreign matter such as dust particles.

A first voltage may be applied to the first electrode AE through the transistor TR, and a second voltage having a lower level than the first voltage may be applied to the second electrode CE. Holes and electrons injected into the emissive layer EML may be combined to form excitons, and the light emitting element OLED may emit light as the excitons transition to a ground state.

The input sensing part ISP may be disposed on the thin-film encapsulation layer TFE. The input sensing part ISP may be directly manufactured on an upper surface of the thin-film encapsulation layer TFE.

A base layer BS may be disposed on the thin-film encapsulation layer TFE. The base layer BS may include an inorganic insulating layer. At least one inorganic insulating layer may be provided on the thin-film encapsulation layer TFE as the base layer BS.

The input sensing part ISP may include a first conductive pattern CTL1 and a second conductive pattern CTL2 disposed on the first conductive pattern CTL1. The first conductive pattern CTL1 may be disposed on the base layer BS. An insulating layer TINS may be disposed on the base layer BS and may cover the first conductive pattern CTL1. The insulating layer TINS may include an inorganic insulating layer or an organic insulating layer. The second conductive pattern CTL2 may be disposed on the insulating layer TINS.

The first and second conductive patterns CTL1 and CTL2 may overlap the non-emissive area NPA. The first and second conductive patterns CTL1 and CTL2 may be disposed on the non-emissive area NPA between the emissive areas PA and may have a mesh shape.

The first and second conductive patterns CTL1 and CTL2 may form sensors of the input sensing part ISP described above. For example, the first and second conductive patterns CTL1 and CTL2 having a mesh shape may be separated from each other in a predetermined area to form the sensors. Part of the second conductive pattern CTL2 may be connected to the first conductive pattern CTL1.

The anti-reflection layer RPL may be disposed on the second conductive pattern CTL2. The anti-reflection layer RPL may include a black matrix BM and a plurality of color filters CF. The black matrix BM may overlap the non-emissive area NPA, and the color filters CF may overlap the emissive areas PA.

The black matrix BM may be disposed on the insulating layer TINS and may cover the second conductive pattern CTL2. An opening B_OP overlapping the emissive area PA and the opening PX_OP may be defined in the black matrix BM. The black matrix BM may absorb and/or block light. The width of the opening B_OP may be greater than the width of the opening PX_OP.

The color filters CF may be disposed on the insulating layer TINS and the black matrix BM. The color filters CF may be disposed in the openings B_OP, respectively. A planarization insulating layer PINS may be disposed on the color filters CF. The planarization insulating layer PINS may provide a flat upper surface.

When external light travelling toward the display panel DP is reflected from the display panel DP and provided back to the user, the user may visually recognize the external light as a mirror-like effect. To prevent such a phenomenon, the anti-reflection layer RPL may include the plurality of color filters CF that display the same colors as those of the pixels PX of the display panel DP. The color filters CF may filter external light with the same colors as the pixels PX. In this case, the external light might not be visible to the user.

However, the present disclosure is not necessarily limited thereto, and the anti-reflection layer RPL may include a polarizer film to decrease the reflectivity of external light. The polarizer film may be separately manufactured and may be attached to the input sensing part ISP by an adhesive layer. The polarizer film may include a phase retarder and/or a polarizer.

Figure 9:
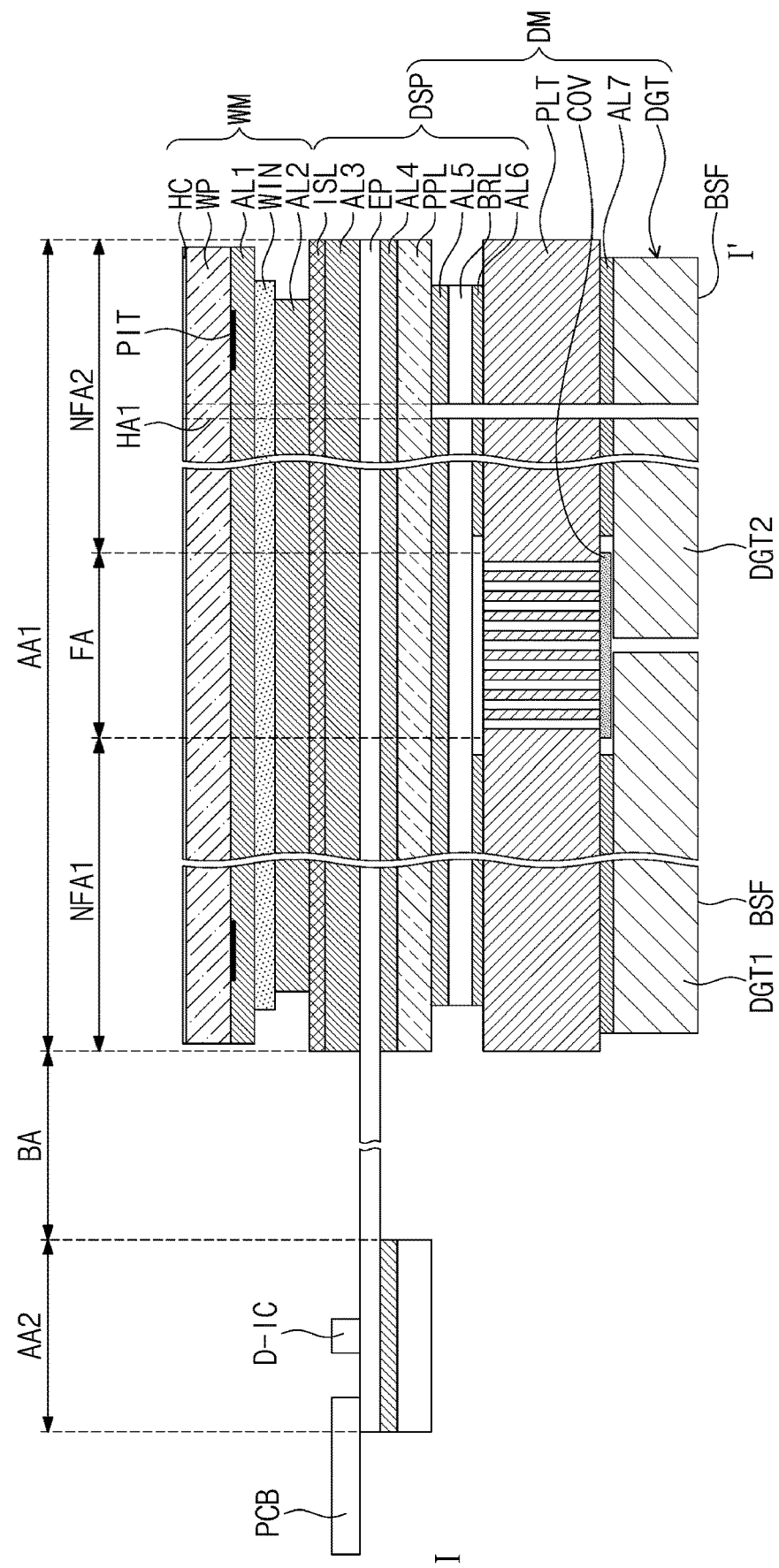
FIG. 9 is a cross-sectional view taken along line I-I' illustrated in FIG. 7.
Figure 10:
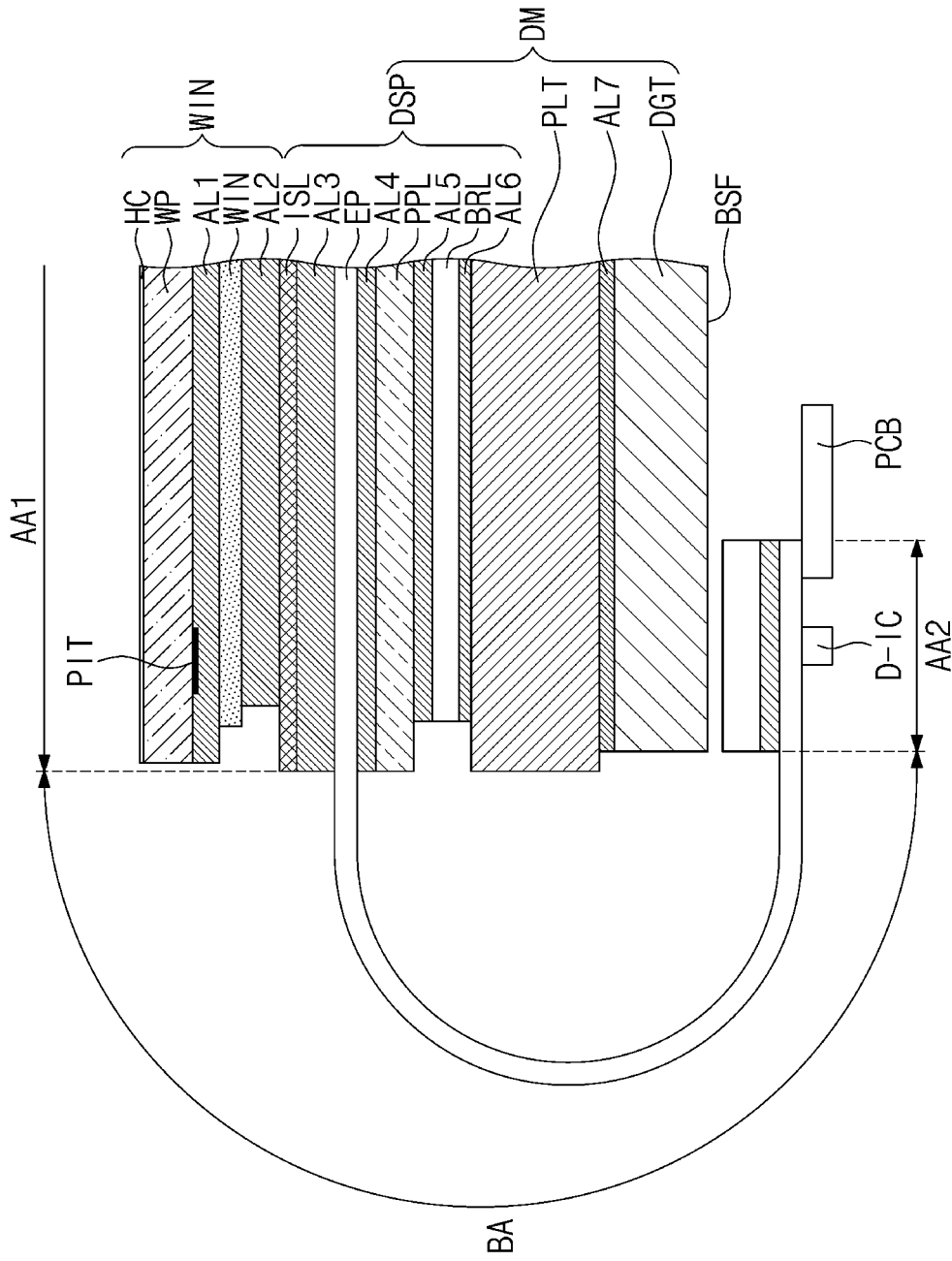
FIG. 10 is a cross-sectional view illustrating a state in which a bending area illustrated in FIG. 9 is bent.

FIG. 9 is a cross-sectional view taken along line I-I' illustrated in FIG. 7. FIG. 10 is a view illustrating a state in which the bending area illustrated in FIG. 9 is bent.

The cross-section of the display module DM and the cross-section of the window module WM that correspond to line I-I' are illustrated together in FIG. 9.

Referring to FIG. 9, the display device DD may include the display module DM and the window module WM disposed over the display module DM. The display module DM may be a flexible display module. The display module DM may include a first non-folding area NFA1, a folding area FA, and a second non-folding area NFA2.

The window module WM may include a window WIN, a window protection layer WP, a hard coating layer HC, and first and second adhesive layers AL1 and AL2.

The display module DM may include a display part DSP, a support plate PLT, a cover layer COV, and a digitizer DGT. The display part DSP may include the electronic panel EP, a shock absorbing layer ISL, the panel protection layer PPL, a barrier layer BRL, and third to sixth adhesive layers AL3 to AL6. The configurations of the electronic panel EP and the panel protection layer PPL have been described above in detail with reference to FIG. 6, and therefore to the extent that a detailed description of one or more elements has been omitted, it may be assumed that these elements are at least similar to corresponding elements that have been described elsewhere within the instant disclosure. The display module DM may include a seventh adhesive layer AL7 disposed between the support plate PLT and the digitizer DGT.

The shock absorbing layer ISL may be disposed over the electronic panel EP. The shock absorbing layer ISL may protect the electronic panel EP by absorbing external shock applied toward the electronic panel EP from above the display device DD. The shock absorbing layer ISL may be manufactured in the form of an oriented film.

The shock absorbing layer ISL may contain a flexible plastic material. The flexible plastic material may be defined as a synthetic resin film. For example, the shock absorbing layer ISL may contain a flexible plastic material such as polyimide (PI) or polyethylene terephthalate (PET).

The window WIN may be disposed over the shock absorbing layer ISL. The window WIN may protect the electronic panel EP from external scratches. The window WIN may be optically transparent. The window WIN may include glass. However, without necessarily being limited thereto, the window WIN may include a synthetic resin film.

The window WIN may have a multi-layer structure or a single layer structure. For example, the window WIN may include a plurality of synthetic resin films coupled by an adhesive or may include a glass substrate and a synthetic resin film coupled by an adhesive.

The window protection layer WP may be disposed over the window WIN. The window protection layer WP may contain a flexible plastic material such as polyimide or polyethylene terephthalate. The hard coating layer HC may be disposed on an upper surface of the window protection layer WP.

A printed layer PIT may be disposed on a lower surface of the window protection layer WP. The printed layer PIT may be black in color, but the color of the printed layer PIT is not necessarily limited thereto. The printed layer PIT may be adjacent to the periphery of the window protection layer WP.

The barrier layer BRL may be disposed under the panel protection layer PPL. The barrier layer BRL may increase resistance to a compressive force caused by external pressing. Accordingly, the barrier layer BRL may serve to prevent deformation of the electronic panel EP. The barrier layer BRL may contain a flexible plastic material such as polyimide or polyethylene terephthalate.

The barrier layer BRL may have a color that absorbs light. For example, the barrier layer BRL may be black in color. In this case, components disposed under the barrier layer BRL might not be visible when the display module DM is viewed from above the display module DM.

The first adhesive layer AL1 may be disposed between the window protection layer WP and the window WIN. The window protection layer WP and the window WIN may be bonded to each other by the first adhesive layer AL1. The first adhesive layer AL1 may cover the printed layer PIT.

The second adhesive layer AL2 may be disposed between the window WIN and the shock absorbing layer ISL. The window WIN and the shock absorbing layer ISL may be bonded to each other by the second adhesive layer AL2.

The third adhesive layer AL3 may be disposed between the shock absorbing layer ISL and the electronic panel EP. The shock absorbing layer ISL and the electronic panel EP may be bonded to each other by the third adhesive layer AL3.

The fourth adhesive layer AL4 may be disposed between the electronic panel EP and the panel protection layer PPL. The electronic panel EP and the panel protection layer PPL may be bonded to each other by the fourth adhesive layer AL4.

The fifth adhesive layer AL5 may be disposed between the panel protection layer PPL and the barrier layer BRL. The panel protection layer PPL and the barrier layer BRL may be bonded to each other by the fifth adhesive layer AL5.

The sixth adhesive layer AL6 may be disposed between the barrier layer BRL and the support plate PLT. The barrier layer BRL and the support plate PLT may be bonded to each other by the sixth adhesive layer AL6.

The sixth adhesive layer AL6 may overlap the first and second non-folding areas NFA1 and NFA2 and might not overlap the folding area FA. For example, the sixth adhesive layer AL6 might not be disposed in the folding area FA.

The first to sixth adhesive layers AL1 to AL6 may include a transparent adhesive such as a pressure sensitive adhesive (PSA) or an optically clear adhesive (OCA) but are not necessarily limited thereto.

Hereinafter, "thickness" may represent a numerical value measured in the third direction DR3, and "width" may represent a numerical value measured in the first or second direction DR1 or DR2 that is a horizontal direction.

The thickness of the panel protection layer PPL may be smaller than the thickness of the window protection layer WP, and the thickness of the barrier layer BRL may be smaller than the thickness of the panel protection layer PPL. The thickness of the electronic panel EP may be smaller than the thickness of the barrier layer BRL and may be equal to the thickness of the window WIN. The thickness of the shock absorbing layer ISL may be smaller than the thickness of the electronic panel EP.

The thickness of the first adhesive layer AL1 may be equal to the thickness of the barrier layer BRL, and the thicknesses of the second adhesive layer AL2 and the third adhesive layer AL3 may be equal to the thickness of the panel protection layer PPL. The thickness of the fourth adhesive layer AL4 may be equal to the thickness of the fifth adhesive layer AL5.

The thicknesses of the fourth adhesive layer AL4 and the fifth adhesive layer AL5 may be smaller than the thickness of the electronic panel EP and may be greater than the thickness of the shock absorbing layer ISL. The thickness of the sixth adhesive layer AL6 may be smaller than the thickness of the shock absorbing layer ISL. The thickness of the hard coating layer HC may be smaller than the thickness of the sixth adhesive layer AL6.

The electronic panel EP, the shock absorbing layer ISL, the panel protection layer PPL, and the third and fourth adhesive layers AL3 and AL4 may have the same width. The width of the electronic panel EP may indicate the width of the portion of the electronic panel EP disposed in the first area AA1. The window protection layer WP and the first adhesive layer AL1 may have the same width. The barrier layer BRL and the fifth and sixth adhesive layers AL5 and AL6 may have the same width.

The widths of the electronic panel EP, the shock absorbing layer ISL, the panel protection layer PPL, and the third and fourth adhesive layers AL3 and AL4 may be greater than the widths of the window protection layer WP and the first adhesive layer AL1. The peripheries of the electronic panel EP, the shock absorbing layer ISL, the panel protection layer PPL, and the third and fourth adhesive layers AL3 and AL4 may be located outward of the peripheries of the window protection layer WP and the first adhesive layer AL1.

The widths of the window WIN and the second adhesive layer AL2 may be smaller than the widths of the window protection layer WP and the first adhesive layer AL1. The width of the second adhesive layer AL2 may be smaller than the width of the window WIN. The periphery of the window WIN may be located inward of the peripheries of the window protection layer WP and the first adhesive layer AL1. The periphery of the second adhesive layer AL2 may be located inward of the periphery of the window WIN.

The widths of the barrier layer BRL and the fifth and sixth adhesive layers AL5 and AL6 may be smaller than the widths of the window protection layer WP and the first adhesive layer AL1. The peripheries of the barrier layer BRL and the fifth and sixth adhesive layers AL5 and AL6 may be located inward of the peripheries of the window protection layer WP and the first adhesive layer AL1.

The support plate PLT may be disposed under the display part DSP and may support the display part DSP. The support plate PLT may support the electronic panel EP.

The support plate PLT may have a higher rigidity than the display part DSP. The support plate PLT may contain a non-metallic material. For example, the support plate PLT may contain a fiber reinforced composite. The fiber reinforced composite may be carbon fiber reinforced plastic (CFRP) or glass fiber reinforced plastic (GFRP).

The support plate PLT containing the fiber reinforced composite may be lightened. The support plate PLT, according to an embodiment, which contains the fiber reinforced composite, may be lighter than a metal support plate made of a metallic material and may have a modulus and a rigidity that are similar to those of the metal support plate.

In addition, the support plate PLT containing the fiber reinforced composite may be more easily shaped than the metal support plate. For example, the support plate PLT containing the fiber reinforced composite may be more easily shaped through a laser process or a micro-blast process.

A plurality of openings OP may be defined in the portion of the support plate PLT that overlaps the folding area FA. The openings OP may be formed through portions of the support plate PLT in the third direction DR3. The openings OP may be formed through the laser process or the micro-blast process mentioned above.

As the openings OP are defined in the portion of the support plate PLT that overlaps the folding area FA, the flexibility of the portion of the support plate PLT that overlaps the folding area FA may be increased. As a result, the support plate PLT may be easily folded about the folding area FA.

The cover layer COV may be disposed under the support plate PLT. The cover layer COV may cover the openings OP, which are defined in the support plate PLT, under the support plate PLT. The cover layer COV may overlap the folding area FA and might not overlap the first and second non-folding areas NFA1 and NFA2. For example, the cover layer COV might not be disposed in the first and second non-folding areas NFA1 and NFA2. The cover layer COV may make contact with a lower surface of the portion of the support plate PLT in which the openings OP are formed.

The cover layer COV may have a lower elastic modulus than that of the support plate PLT. For example, the cover layer COV may contain thermoplastic poly-urethane or rubber. However, the material of the cover layer COV is not necessarily limited thereto. The cover layer COV may be manufactured in a sheet form and may be attached to the support plate PLT.

The digitizer DGT may be disposed under the support plate PLT. The cover layer COV may be disposed between the support plate PLT and the digitizer DGT. The cover layer COV may be spaced apart from an upper surface of the digitizer DGT.

The digitizer DGT is a device that receives an input of position information that the user instructs on the display surface. The digitizer DGT may be implemented in an electromagnetic type or the digitizer DGT may be implemented in an electromagnetic resonance type. For example, the digitizer DGT may include a digitizer sensor substrate that includes a plurality of coils. However, without necessarily being limited thereto, the digitizer DGT may be implemented in an active electrostatic type.

When the user moves a pen/stylus on the display device DD, the pen/stylus may be driven by an AC signal to cause an oscillating magnetic field, and the oscillating magnetic field may induce a signal to the coils. The position of the pen/stylus may be detected through the signal induced to the coils. The digitizer DGT may recognize the position of the pen/stylus by sensing an electromagnetic change caused by access of the pen/stylus.

If the support plate PLT disposed over the digitizer DGT and adjacent to the digitizer DGT contains metal, the sensitivity of the digitizer DGT may be lowered by the metal. For example, when a signal transmitted on the display device DD is blocked due to signal interference by a metal support plate, the digitizer DGT might not operate normally. However, in an embodiment of the present disclosure, the support plate PLT disposed over the digitizer DGT may contain the non-metallic fiber reinforced composite, and thus the digitizer DGT may operate normally.

The digitizer DGT may be disposed under the display panel DP and may be divided into two parts in the folding area FA. The digitizer DGT may include a first digitizer DGT1 disposed under the first non-folding area NFA1 and a second digitizer DGT2 disposed under the second non-folding area NFA2. The first digitizer DGT1 and the second digitizer DGT2 may be connected together by a plurality of flexible circuit boards. This configuration will be described below in detail.

Surfaces of the first and second digitizers DGT1 and DGT2 that do not face the display panel DP may be defined as rear surfaces BSF of the first and second digitizers DGT1 and DGT2.

The seventh adhesive layer AL7 may be disposed between the support plate PLT and the digitizer DGT. The support plate PLT and the digitizer DGT may be bonded to each other by the seventh adhesive layer AL7. The seventh adhesive layer AL7 might not be disposed in the folding area FA. For example, the seventh adhesive layer AL7 may be open in the folding area FA. The above-described cover layer COV may be disposed in the opening of the seventh adhesive layer AL7.

The width of the support plate PLT may be substantially the same as the width of the electronic panel EP. The widths of the digitizer DGT and the seventh adhesive layer AL7 may be smaller than the width of the support plate PLT. The peripheries of the digitizer DGT and the seventh adhesive layer AL7 may be located inward of the periphery of the support plate PLT.

The thickness of the support plate PLT may be greater than the thickness of the digitizer DGT, and the thickness of the digitizer DGT may be greater than the thickness of the window protection layer WP. The thickness of the seventh adhesive layer AL7 may be greater than the thickness of the cover layer COV. The thickness of the cover layer COV may be equal to the thickness of the sixth adhesive layer AL6.

A first hole H1 may be defined in the portion of the display module DM that overlaps the first hole area HA1. The first hole H1 may be defined in the layers from the digitizer DGT to the layer under the panel protection layer PPL. For example, the first hole H1 may be integrally defined in the barrier layer BRL, the support plate PLT, the digitizer DGT, and the fifth to seventh adhesive layers AL5 to AL7.

A second hole may be formed in the second hole area HA2. Like the first hole H1, the second hole may be defined in the layers from the digitizer DGT to the layer under the panel protection layer PPL. The above-described camera CA may be disposed in the first hole H1, and the above-described sensor SN may be disposed in the second hole.

Referring to FIGS. 9 and 10, the panel protection layer PPL and the fourth adhesive layer AL4 might not be disposed under the bending area BA. The panel protection layer PPL and the fourth adhesive layer AL4 may be disposed under the second area AA2 of the electronic panel EP. The data driver DDV may be disposed on the second area AA2 of the electronic panel EP.

A printed circuit board PCB may be connected to the second area AA2 of the electronic panel EP. The printed circuit board PCB may be connected to one side of the second area AA2. As the bending area BA is bent, the second area AA2 may be disposed under the first area AA1. Accordingly, the data driver DDV and the printed circuit board PCB may be disposed under the first area AA1.

Figure 11:
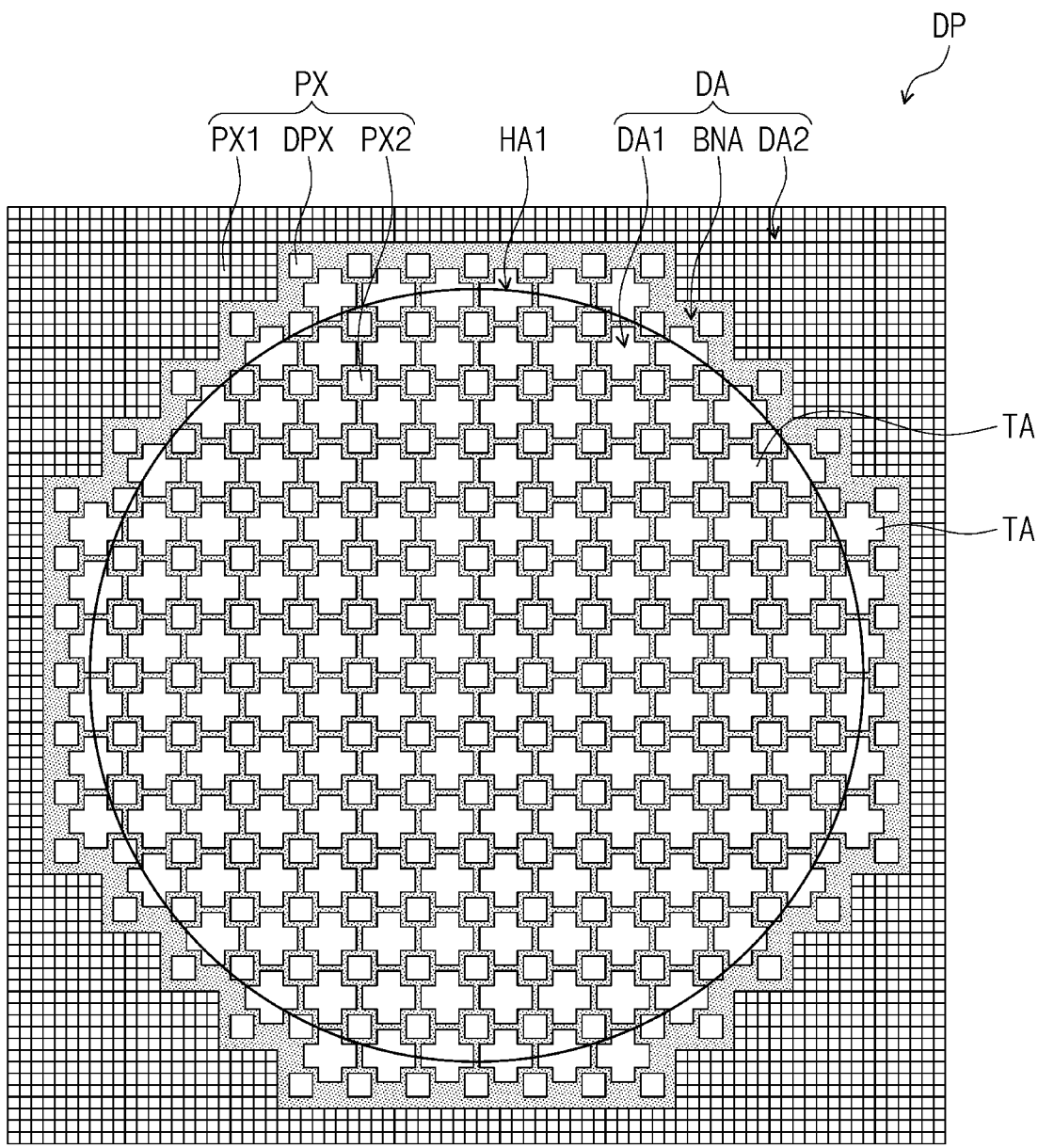
FIG. 11 is an enlarged plan view of a first hole area of the display panel illustrated in FIG. 9.

FIG. 11 is an enlarged plan view of the first hole area of the display panel illustrated in FIG. 9.

Although a planar configuration of the first hole area HA1 is illustrated, a planar configuration of the second hole area HA2 may be substantially the same as that of the first hole area HA1.

Referring to FIG. 11, the display area DA may include a first display area DA1, a second display area DA2 around the first display area DA1, and a boundary area BNA between the first display area DA1 and the second display area DA2. The first display area DA1 may be defined by the first hole area HAL Pixels PX may include a plurality of first pixels PX1, a plurality of second pixels PX2, and a plurality of dummy pixels DPX. The first pixels PX1 may be disposed in the second display area DA2. The second pixels PX2 may be disposed in the first display area DA1. The dummy pixels DPX may be disposed in the boundary area BNA. For example, the boundary area BNA adjacent to the second display area DA2 may have a substantially octagonal shape. However, the shape of the boundary area BNA is not necessarily limited thereto.

For example, the second pixels PX2 may be arranged in the first direction DR1 and the second direction DR2 in the first display area DA1. However, the arrangement of the second pixels PX2 is not necessarily limited thereto. The dummy pixels DPX may be disposed to at least partially surround the first display area DA1 along the boundary area BNA. The second pixels PX2 and the dummy pixels DPX may each include a plurality of sub-pixels that display red, green, and blue colors. The first pixels PX1 and the sub-pixels may substantially have the structure illustrated in FIG. 8.

The first display area DA1 may display an image by the second pixels PX2. The second display area DA2 may display an image by the first pixels PX1. The boundary area BNA may display an image by the dummy pixels DPX. Accordingly, a predetermined image may be displayed on the display area DA by light generated from the first pixels PX1, the second pixels PX2, and the dummy pixels DPX.

The display panel DP may include a plurality of transmissive areas TA overlapping the first hole area HA1. The transmissive areas TA may be disposed among the second pixels PX2. Furthermore, the transmissive areas TA may be disposed between the dummy pixels DPX and the second pixels PX2 adjacent to the dummy pixels DPX.

For example, the transmissive areas TA may have a cross shape. However, the shape of the transmissive areas TA is not necessarily limited thereto. The transmissive areas TA may be disposed around each of the second pixels PX2. The transmissive areas TA may be disposed in a first diagonal direction DDR1 and a second diagonal direction DDR2 with respect to each of the second pixels PX2.

The first diagonal direction DDR1 may be defined as a direction crossing the first and second directions DR1 and DR2 on the plane defined by the first and second directions DR1 and DR2. The second diagonal direction DDR2 may be defined as a direction crossing the first diagonal direction DDR1 on the plane defined by the first and second directions DR1 and DR2. For example, the first and second directions DR1 and DR2 may cross each other at a right angle, and the first and second diagonal directions DDR1 and DDR2 may cross each other at a right angle.

The transmissive areas TA may have a higher light transmittance than the first and second pixels PX1 and PX2 and the dummy pixels DPX. Light (for example, as in the above-described optical signal) transmitting through the transmissive areas TA may be provided to the camera CA disposed under the first display area DA1. For example, the light transmittance of the first hole area HA1 may be increased by the transmissive areas TA, and light may be provided to the camera CA through the first hole area HAL Accordingly, the first display area DA1 may display an image. Additionally, light passing through the first display area DA1 may be provided to the camera CA so that the camera CA may take an image.

Figure 12:
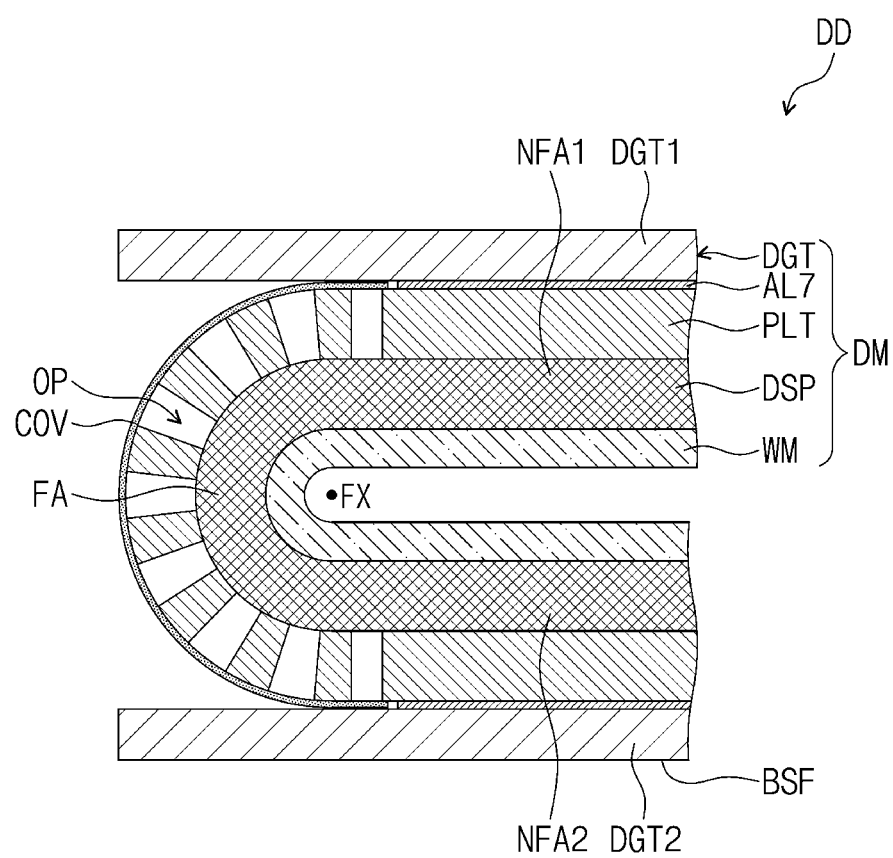
FIG. 12 is a cross-sectional view illustrating a folded state of a display device illustrated in FIG. 9.

FIG. 12 is a view illustrating a folded state of the display device illustrated in FIG. 9.

For convenience of description, the bending area BA and the second area AA2 of the electronic panel EP illustrated in FIG. 9 are omitted in FIG. 12.

Referring to FIG. 12, the display device DD may be folded about the folding axis FX in an in-folding manner. The folding area FA may be bent, and thus the first non-folding area NFA1 and the second non-folding area NFA2 may face each other. The display device DD may be changed from a first state (a flat state) illustrated in FIG. 9 to a second state (a folded state) illustrated in FIG. 12 or may be changed from the second state to the first state. Such a folding motion may be repeatedly performed without the display module DM sustaining damage.

The folding area FA of the display module DM may be easily bent because the display module DM is a flexible display module. The plurality of openings OP overlapping the folding area FA may be defined in the support plate PLT. Accordingly, in a folding motion, the portion of the support plate PLT that overlaps the folding area FA may be easily bent by the openings OP.

The cover layer COV may make contact with the support plate PLT without making contact with the digitizer DGT. When the display device DD is folded, the first and second digitizers DGT1 and DGT2 divided from each other may move away from each other.

If the cover layer COV is attached to the support plate PLT and the first and second digitizers DGT1 and DGT2, the first and second digitizers DGT1 and DGT2 might not be spaced apart from each other due to the adhesive force between the first and second digitizers DGT1 and DGT2 and the cover layer COV when the display device DD is folded. Accordingly, a folding motion of the display device DD may be difficult.

In an embodiment of the present disclosure, the cover layer COV may be attached to only the support plate PLT without being attached to the digitizer DGT, and thus the display device DD may be easily folded.

Figure 13:
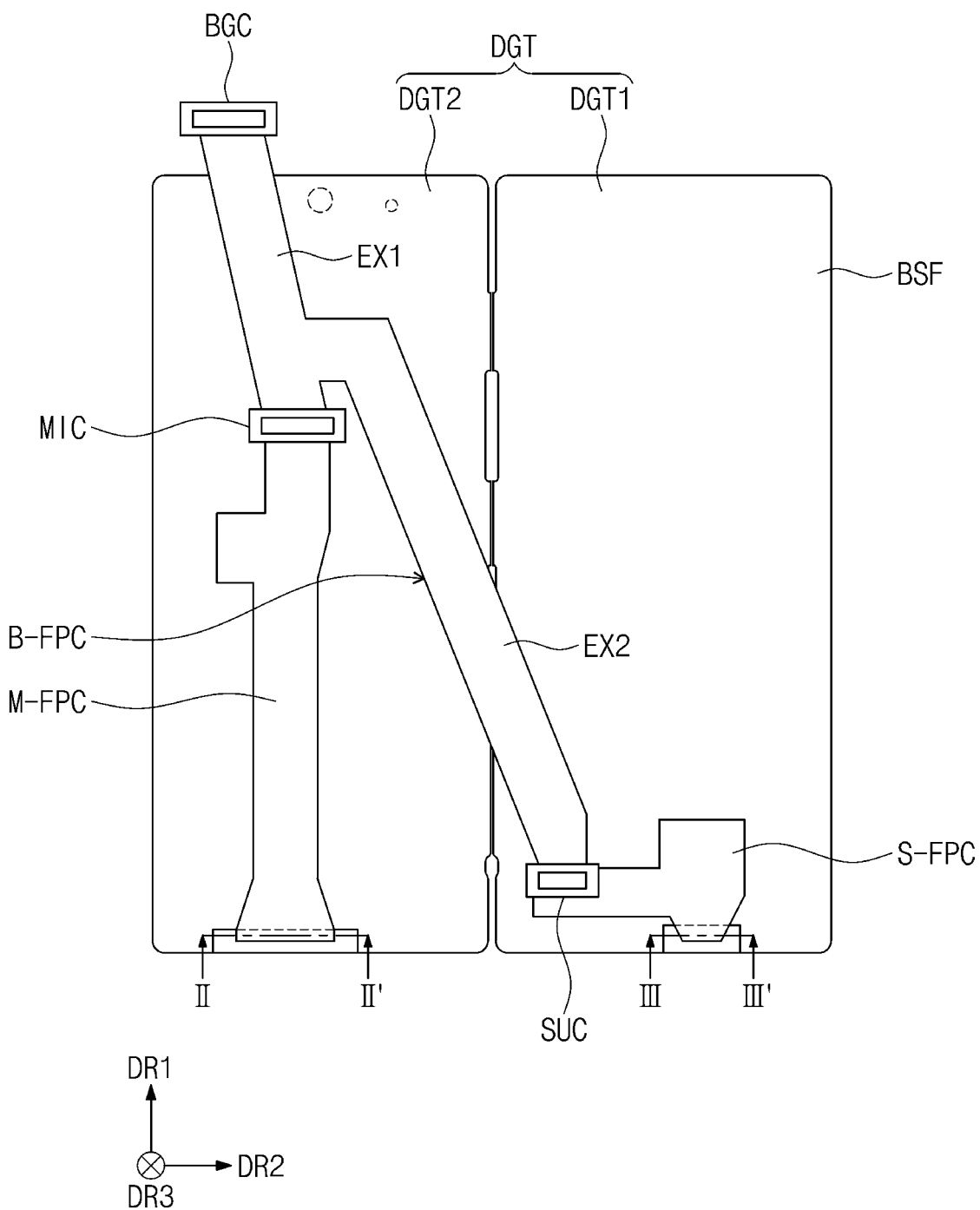
FIG. 13 is a plan view illustrating flexible circuit boards disposed on rear surfaces of first and second digitizers illustrated in FIG. 9.

FIG. 13 is a view illustrating flexible circuit boards disposed on the rear surfaces of the first and second digitizers illustrated in FIG. 9.

For example, FIG. 13 illustrates a plan view of the first and second digitizers DGT1 and DGT2 as viewed from the rear.

Referring to FIG. 13, the first digitizer DGT1 and the second digitizer DGT2 may be arranged in the second direction DR2. The second digitizer DGT2 may be defined as the main digitizer, and the first digitizer DGT1 may be defined as the sub-digitizer. The first digitizer DGT1 and the second digitizer DGT2 may be connected together by the plurality of flexible circuit boards M-FPC, S-FPC, and B-FPC. The flexible circuit boards M-FPC, S-FPC, and B-FPC may be disposed on the rear surface BSF of the digitizer DGT.

The flexible circuit boards M-FPC, S-FPC, and B-FPC may include the main flexible circuit board M-FPC, the sub-flexible circuit board S-FPC, and the bridge flexible circuit board B-FPC. The main flexible circuit board M-FPC may be disposed on the rear surface BSF of the second digitizer DGT2 and may be connected to the second digitizer DGT2. The sub-flexible circuit board S-FPC may be disposed on the rear surface BSF of the first digitizer DGT1 and may be connected to the first digitizer DGT1.

The bridge flexible circuit board B-FPC may be disposed on the rear surfaces BSF of the first and second digitizers DGT1 and DGT2 and may be connected to the main flexible circuit board M-FPC and the sub-flexible circuit board S-FPC. The bridge flexible circuit board B-FPC may be connected to the first and second digitizers DGT1 and DGT2 through the main flexible circuit board M-FPC and the sub-flexible circuit board S-FPC.

The main flexible circuit board M-FPC may extend in the first direction DR1. One side of the main flexible circuit board M-FPC may be connected to the second digitizer DGT2. When viewed on the plane, the one side of the main flexible circuit board M-FPC may be connected to a lower side of the second digitizer DGT2. An opposite side of the main flexible circuit board M-FPC may be connected to the bridge flexible circuit board B-FPC.

One side of the sub-flexible circuit board S-FPC may be connected to the first digitizer DGT1. When viewed on the plane, the one side of the sub-flexible circuit board S-FPC may be connected to a lower side of the first digitizer DGT1. An opposite side of the sub-flexible circuit board S-FPC may be connected to the bridge flexible circuit board B-FPC.

A main connector MIC, a sub-connector SUC, and a bridge connector BGC may be connected to the bridge flexible circuit board B-FPC. The opposite side of the main flexible circuit board M-FPC may be connected to the main connector MIC, and the opposite side of the sub-flexible circuit board S-FPC may be connected to the sub-connector SUC. The main flexible circuit board M-FPC and the sub-flexible circuit board S-FPC may be connected to the bridge flexible circuit board B-FPC through the main connector MIC and the sub-connector SUC.

The bridge flexible circuit board B-FPC may include a first extension EX1 and a second extension EX2. The first extension EX1 may be disposed on the rear surface of the second digitizer DGT2 and may be connected to the main flexible circuit board M-FPC. The second extension EX2 may extend from a portion of the first extension EX1 to the rear surface of the first digitizer DGT1 and may be connected to the sub-flexible circuit board S-FPC.

The main connector MIC may be connected to one side of the first extension EX1, and the bridge connector BGC may be connected to an opposite side of the first extension EX1. When viewed on the plane, the bridge connector BGC may be disposed outside the second digitizer DGT2. The sub-connector SUC may be connected to one side of the second extension EX2.

The main flexible circuit board M-FPC may be connected to the first extension EX1 by being connected to the main connector MIC. The sub-flexible circuit board S-FPC may be connected to the second extension EX2 by being connected to the sub-connector SUC.

Figure 14:
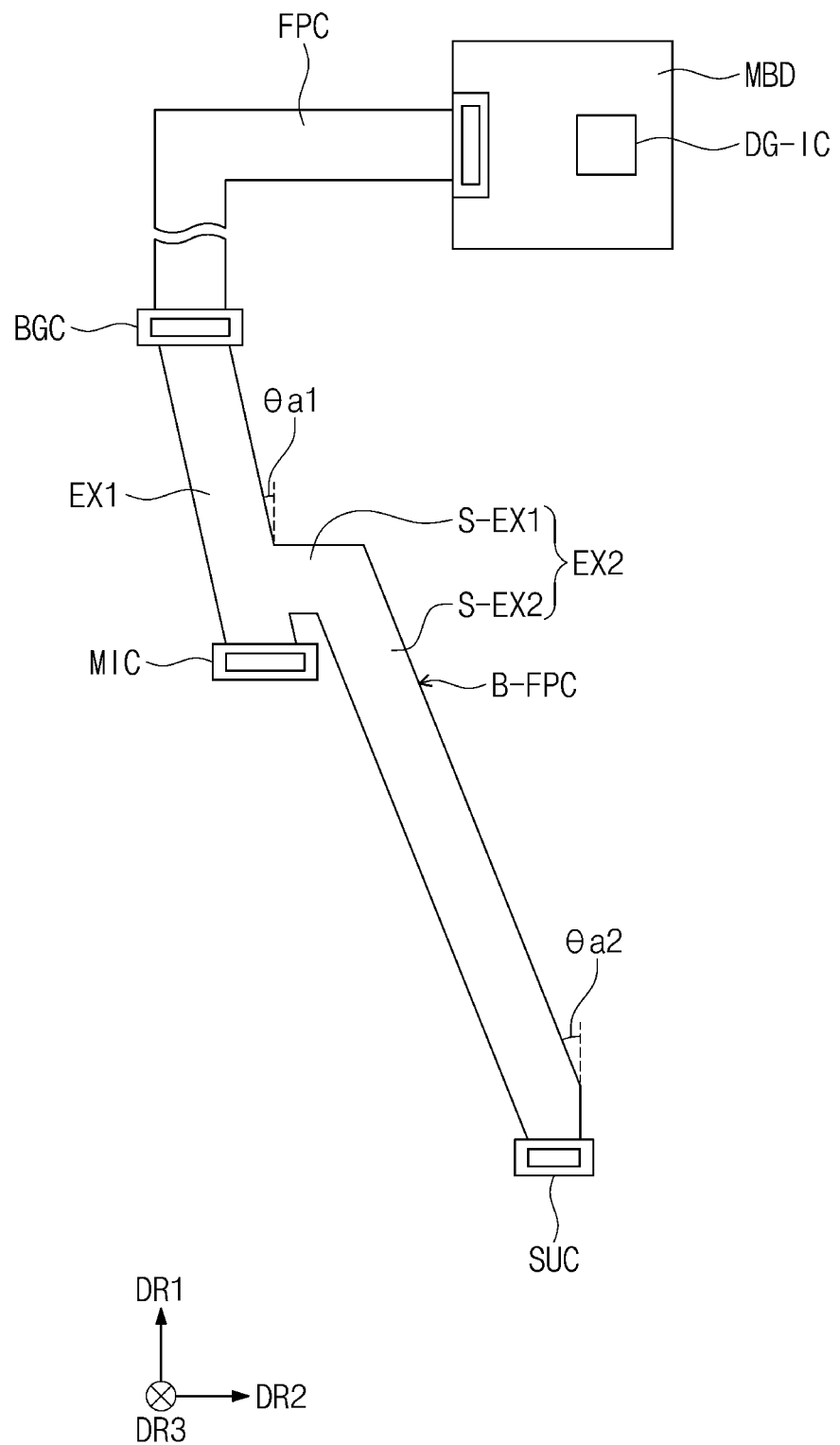
FIGS. 14, 15, and 16 are plan views illustrating a bridge flexible circuit board, a main flexible circuit board, and a sub-flexible circuit board of FIG. 13, respectively.
Figure 15:
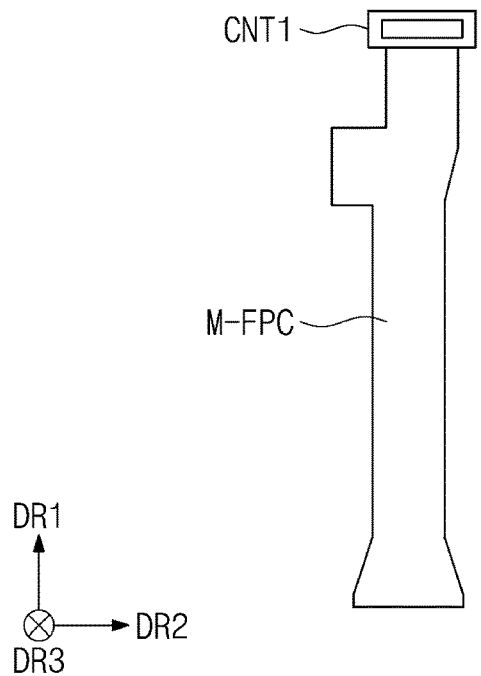
Figure 16:
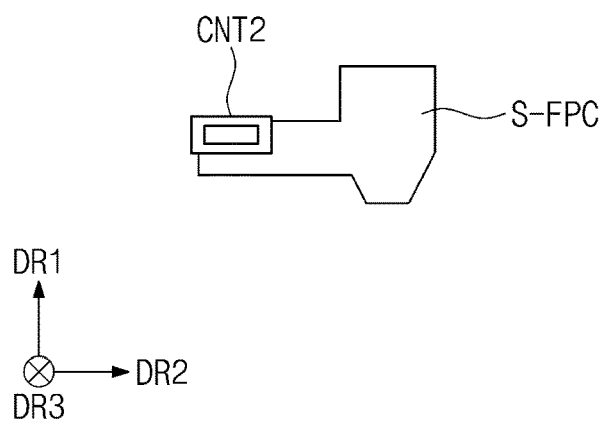

FIGS. 14, 15, and 16 are views illustrating the bridge flexible circuit board, the main flexible circuit board, and the sub-flexible circuit board of FIG. 13, respectively.

Referring to FIG. 14, the bridge flexible circuit board B-FPC may be connected to an external main board MBD through a flexible circuit board FPC. The control module 10 illustrated in FIG. 5 may be disposed on the main board MBD. A digitizer driver IC DG-IC may be disposed on the main board MBD.

The bridge flexible circuit board B-FPC may be connected to the digitizer driver IC DG-IC through the main board MBD. The digitizer driver IC DG-IC may be connected to the bridge connector BGC. The digitizer driver IC DG-IC may be provided singly.

The first extension EX1 may extend so as to be inclined with respect to the first direction DR1. The first extension EX1 may extend to form a first acute angle $\theta a1$ with respect to the first direction DR1.

The second extension EX2 may include a first sub-extension S-EX1 and a second sub-extension S-EX2. The first sub-extension S-EX1 may extend from a portion of the first extension EX1 in the second direction DR2.

The second sub-extension S-EX2 may extend from the first sub-extension S-EX1 and may be connected to the sub-flexible circuit board S-FPC. The sub-connector SUC may be connected to one side of the second sub-extension S-EX2 and may be connected to the sub-flexible circuit board S-FPC. The second sub-extension S-EX2 may extend to form a second acute angle $\theta a2$ different from the first acute angel $\theta a1$ with respect to the first direction DR1. The second acute angle $\theta a2$ may be greater than the first acute angle $\theta a1$.

Referring to FIGS. 14 and 15, a first connector CNT1 may be connected to the opposite side of the main flexible circuit board M-FPC. The first connector CNT1 may be connected to the main connector MIC. One of the first connector CNT1 and the main connector MIC may be a female terminal, and the other may be a male terminal. As the first connector CNT1 is connected to the main connector MIC, the main flexible circuit board M-FPC may be connected to the bridge flexible circuit board B-FPC.

Referring to FIGS. 14 and 16, a second connector CNT2 may be connected to the opposite side of the sub-flexible circuit board S-FPC. The second connector CNT2 may be connected to the sub-connector SUC. One of the second connector CNT2 and the sub-connector SUC may be a female terminal, and the other may be a male terminal. As the second connector CNT2 is connected to the sub-connector SUC, the sub-flexible circuit board S-FPC may be connected to the bridge flexible circuit board B-FPC.

Figure 17:
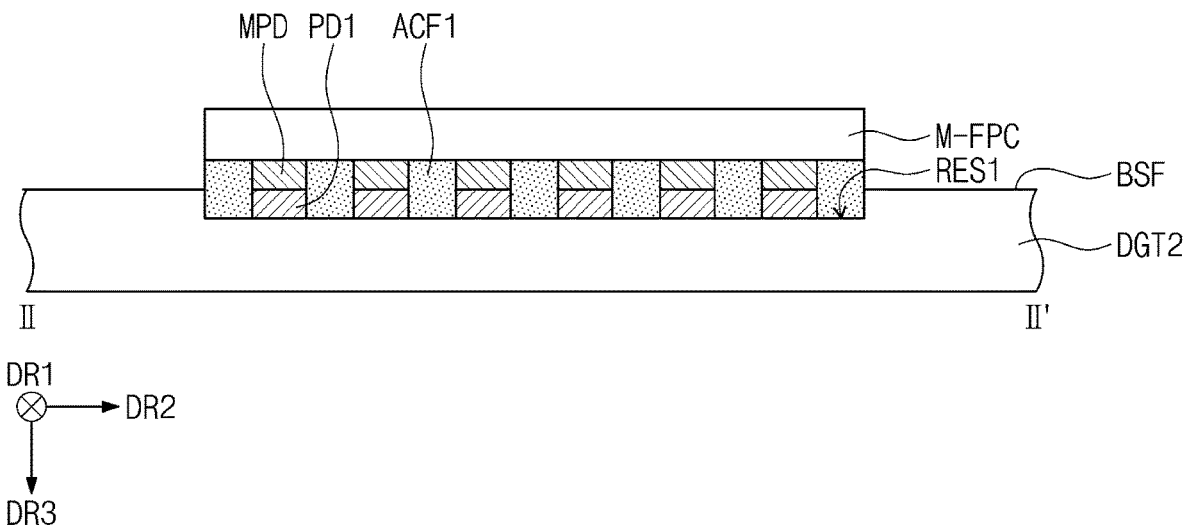
FIG. 17 is a cross-sectional view taken along line II-IF illustrated in FIG. 13.

FIG. 17 is a cross-sectional view taken along line II-IF illustrated in FIG. 13.

Referring to FIG. 17, a plurality of main pads MPD may be disposed on one surface of the main flexible circuit board M-FPC that faces the rear surface BSF of the second digitizer DGT2.

A first depression RES1 may be defined on the rear surface BSF of the second digitizer DGT2. A portion of the rear surface BSF of the second digitizer DGT2 may be recessed to define the first depression RES1. A plurality of first pads PD1 may be disposed in the first depression RES1.

When the first pads PD1 are disposed on the rear surface BSF of the second digitizer DGT2, the first pads PD1 may further protrude upward beyond the rear surface BSF. Accordingly, a step formed by the first pads PD1 and the rear surface BSF may increase.

However, in an embodiment of the present disclosure, the first pads PD1 may be disposed in the first depression RES1 such that the first pads PD1 protrude to a lesser above the rear surface BSF. Accordingly, the step formed by the first pads PD1 and the rear surface BSF may be made smaller.

The first pads PD1 may be disposed under the main pads MPD in a one-to-one correspondence. The first pads PD1 may be electrically connected to the main pads MPD, respectively. The first pads PD1 and the main pads MPD may be connected by a first anisotropic conductive film ACF1.

A plurality of lines may be disposed on the main flexible circuit board M-FPC. The lines of the main flexible circuit board M-FPC may extend toward the main pads MPD and may be connected to the main pads MPD.

A plurality of conductive patterns may be disposed on the second digitizer DGT2. The conductive patterns of the second digitizer DGT2 may extend toward the first pads PD1 and may be connected to the first pads PD1.

Figure 18:
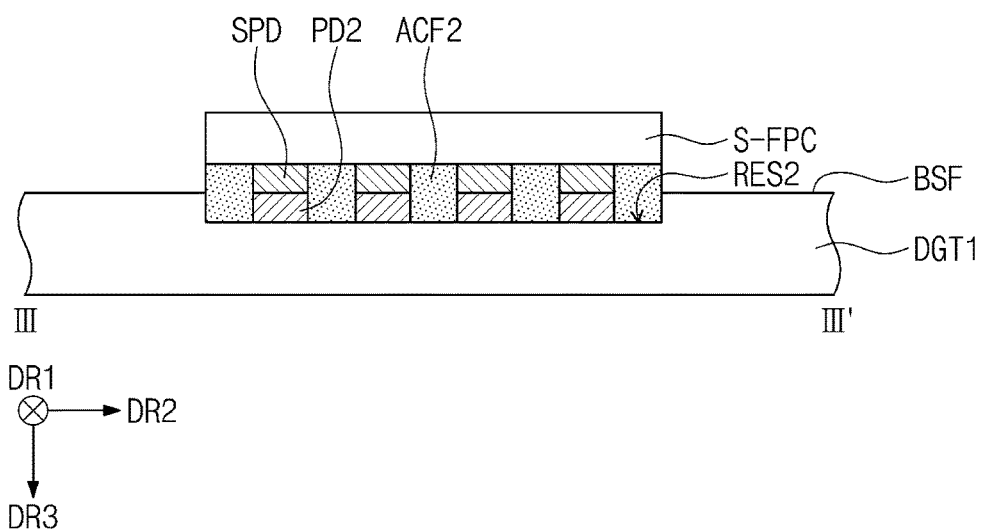
FIG. 18 is a cross-sectional view taken along line illustrated in FIG. 13.

FIG. 18 is a cross-sectional view taken along line III-III' illustrated in FIG. 13.

Referring to FIG. 18, a plurality of sub-pads SPD may be disposed on one surface of the sub-flexible circuit board S-FPC that faces the rear surface BSF of the first digitizer DGT1.

A second depression RES2 may be defined on the rear surface BSF of the first digitizer DGT1. A portion of the rear surface BSF of the first digitizer DGT1 may be recessed to define the second depression RES2. A plurality of second pads PD2 may be disposed in the second depression RES2.

The second pads PD2 may be disposed in the second depression RES2 such that the second pads PD2 protrude less above the rear surface BSF. Accordingly, a step formed by the second pads PD2 and the rear surface BSF may be made smaller.

The second pads PD2 may be disposed under the sub-pads SPD in a one-to-one correspondence. The second pads PD2 may be electrically connected to the sub-pads SPD, respectively. The second pads PD2 and the sub-pads SPD may be connected by a second anisotropic conductive film ACF2.

A plurality of lines may be disposed on the sub-flexible circuit board S-FPC. The lines of the sub-flexible circuit board S-FPC may extend toward the sub-pads SPD and may be connected to the sub-pads SPD.

A plurality of conductive patterns may be disposed on the first digitizer DGT1. The conductive patterns of the first digitizer DGT1 may extend toward the second pads PD2 and may be connected to the second pads PD2.

Figure 19:
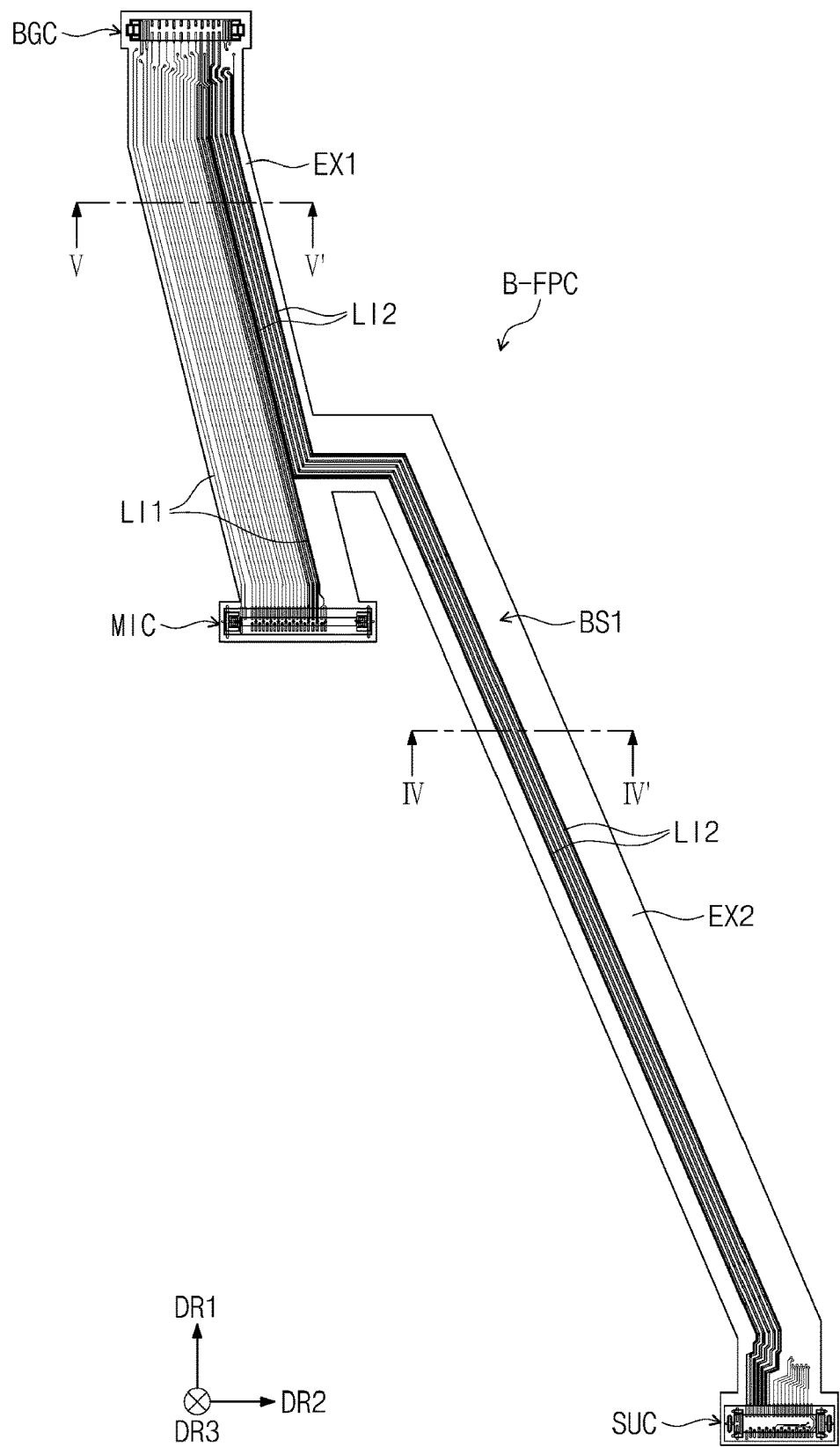
FIG. 19 is an enlarged plan view of a rear side of the bridge flexible circuit board illustrated in FIG. 13.
Figure 20:
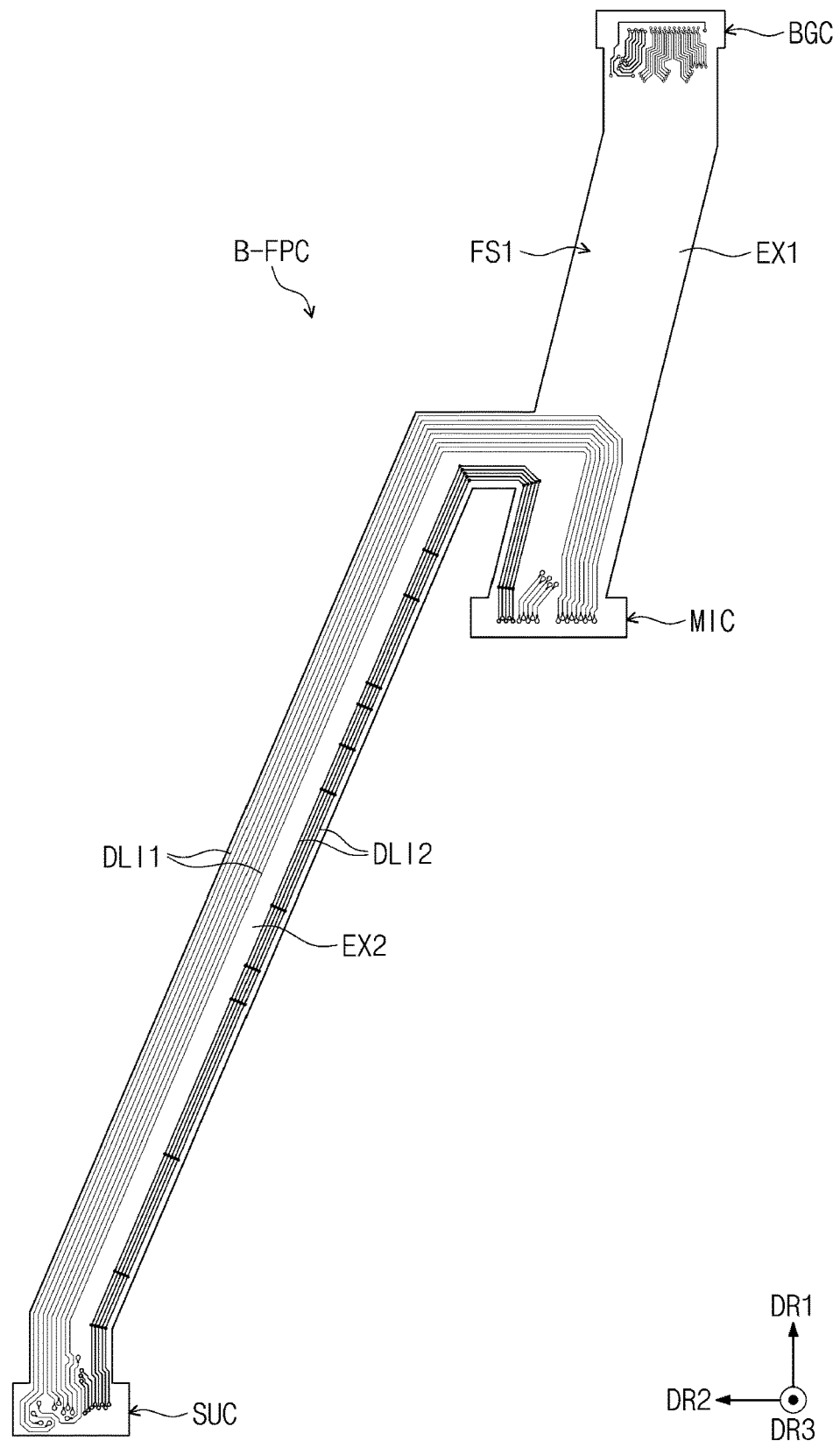
FIG. 20 is an enlarged plan view of a front side of the bridge flexible circuit board illustrated in FIG. 13.

FIG. 19 is an enlarged view of a rear side of the bridge flexible circuit board illustrated in FIG. 13. FIG. 20 is an enlarged view of a front side of the bridge flexible circuit board illustrated in FIG. 13.

Hereinafter, FIG. 13 will be described together with FIGS. 19 and 20 according to the need for explanation.

Referring to FIGS. 13, 19, and 20, a front surface FS1 of the bridge flexible circuit board B-FPC may be defined as a surface facing the rear surface BSF of the digitizer DGT. A rear surface BS1 of the bridge flexible circuit board B-FPC may be defined as a surface facing away from the front surface FS1 of the bridge flexible circuit board B-FPC. The rear surface BS1 of the bridge flexible circuit board B-FPC might not face the rear surface BSF of the digitizer DGT.

Patterns inside the bridge connector BGC, the main connector MIC, and the sub-connector SUC are illustrated in FIGS. 19 and 20.

Referring to FIG. 19, on the rear surface BS1 of the bridge flexible circuit board B-FPC, the bridge flexible circuit board B-FPC may include a plurality of first lines LI1 and a plurality of second lines LI2. The first lines LI1 and the second lines LI2 may be substantially disposed inside the bridge flexible circuit board B-FPC. This configuration is illustrated in cross-sectional views of FIGS. 21 and 22.

The first lines LI1 may be disposed inside the first extension EX1. The first lines LI1 may extend in the extension direction of the first extension EX1. The first lines IL1 may be connected to the bridge connector BGC. The first lines IL1 may extend toward the main connector MIC and may be connected to the main connector MIC. The first lines LI1 might not be disposed inside the second extension EX2. The first lines LI1 might not be connected to the sub-connector SUC.

The first lines LI1 may be connected to the above-described digitizer driver IC DG-IC through the bridge connector BGC. The first lines LI1 may be connected to the main flexible circuit board M-FPC through the main connector MIC. The first lines LI1 may be connected to the second digitizer DGT2 through the main flexible circuit board M-FPC.

The second lines LI2 may be disposed inside the first extension EX1 and the second extension EX2. The second lines LI2 may extend in the extension direction of the first extension EX1 and may then extend to the second extension EX2. The second lines LI2 may extend in the extension direction of the second extension EX2. The second lines IL2 may be connected to the bridge connector BGC. The second lines IL2 may extend toward the sub-connector SUC and may be connected to the sub-connector SUC. The second lines LI2 might not be connected to the main connector MIC.

The second lines LI2 may be connected to the above-described digitizer driver IC DG-IC through the bridge connector BGC. The second lines LI2 may be connected to the sub-flexible circuit board S-FPC through the sub-connector SUC. The second lines LI2 may be connected to the first digitizer DGT1 through the sub-flexible circuit board S-FPC.

Referring to FIG. 20, on front surface FS1 of the bridge flexible circuit board B-FPC, the bridge flexible circuit board B-FPC may include a plurality of first dummy lines DLI1 and a plurality of second dummy lines DLI2. The first dummy lines DLI1 and the second dummy lines DLI2 may be substantially disposed inside the bridge flexible circuit board B-FPC. This configuration is illustrated in the cross-sectional view of FIG. 21.

The first dummy lines DLI1 and the second dummy lines DLI2 may be disposed inside the first extension EX1 and the second extension EX2. The first and second dummy lines DLI1 and DLI2 may be connected to the main connector MIC and may extend in the extension direction of the first extension EX1.

The first and second dummy lines DLI1 and DLI2 may extend in the extension direction of the first extension EX1 and may then extend to the second extension EX2. The first and second dummy lines DLI1 and DLI2 may extend in the extension direction of the second extension EX2 and may be connected to the sub-connector SUC. The first and second dummy lines DLI1 and DLI2 might not be connected to the bridge connector BGC.

The first dummy lines DLI1 and the second dummy lines DLI2 may extend in the state of being spaced apart from each other. The first and second dummy lines DLI1 and DLI2 may be connected to the main flexible circuit board M-FPC through the main connector MIC. The first and second dummy lines DLI1 and DLI2 may be connected to the second digitizer DGT2 through the main flexible circuit board M-FPC.

The first and second dummy lines DLI1 and DLI2 may be connected to the sub-flexible circuit board S-FPC through the sub-connector SUC. The first and second dummy lines DLI1 and DLI2 may be connected to the first digitizer DGT1 through the sub-flexible circuit board S-FPC.

Figure 21:
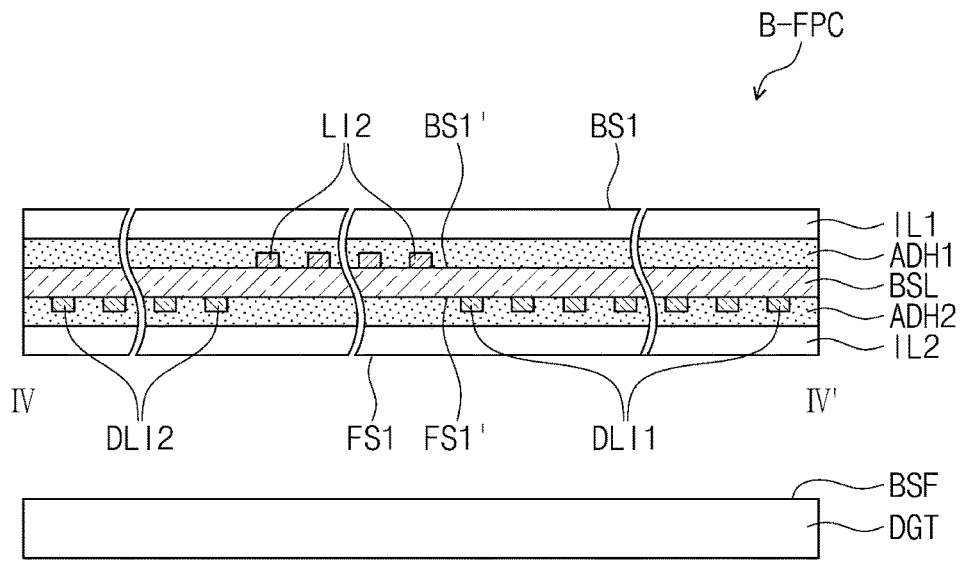
FIG. 21 is a cross-sectional view taken along line IV-IV' illustrated in FIG. 19.
Figure 21:
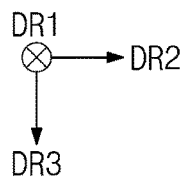
Figure 22:
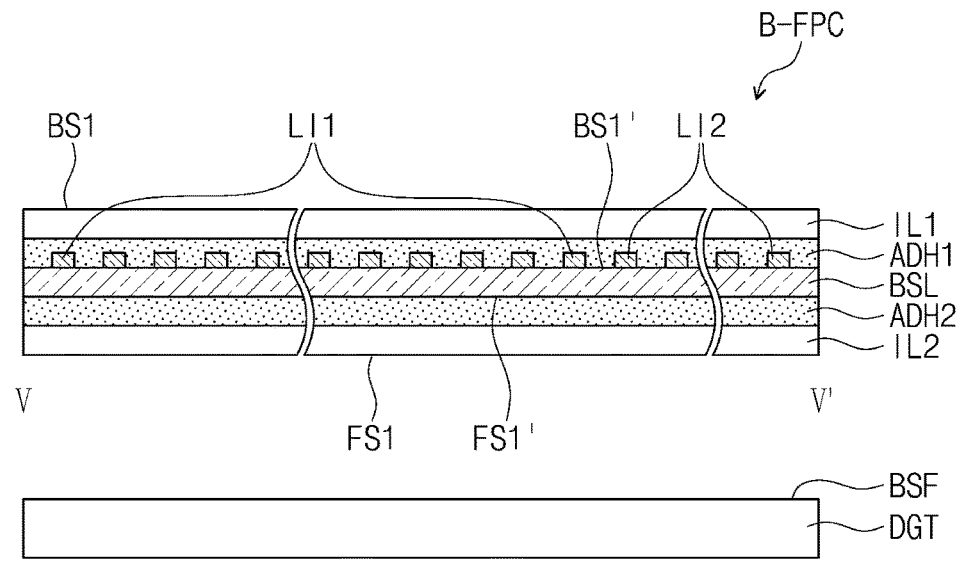
FIG. 22 is a cross-sectional view taken along line V-V' illustrated in FIG. 19.
Figure 22:
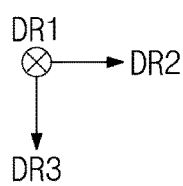

FIG. 21 is a cross-sectional view taken along line IV-IV' illustrated in FIG. 19. FIG. 22 is a cross-sectional view taken along line V-V' illustrated in FIG. 19.

In FIGS. 21 and 22, cross-sections of FIGS. 19 and 20 that correspond to line IV-IV' and line V-V' are illustrated together.

Referring to FIGS. 21 and 22, a base layer BSL may be disposed over the rear surface BSF of the digitizer DGT. A surface of the base layer BSL that faces the digitizer DGT may be defined as a front surface FS1' of the base layer BSL. A surface of the base layer BSL that faces away from the front surface FS1' of the base layer BSL may be defined as a rear surface BS1' of the base layer BSL.

The first and second lines LI1 and LI2 may be disposed on the rear surface BS1' of the base layer BSL. The first and second dummy lines DLI1 and DLI2 may be disposed on the front surface FS1' of the base layer BSL. Accordingly, the base layer BSL may be disposed between the first and second lines LI1 and LI2 and the first and second dummy lines DLI1 and DLI2.

The first and second lines LI1 and LI2 may be disposed in the same layer. The first and second dummy lines DLI1 and DLI2 may be disposed in the same layer. The first and second dummy lines DLI1 and DLI2 may be disposed in a different layer from the first and second lines LI1 and LI2.

A first adhesive layer ADH1 may be disposed on the rear surface BS1' of the base layer BSL. The first adhesive layer ADH1 may be disposed on the rear surface BS1' of the base layer BSL and may cover the first and second lines LI1 and LI2.

A first insulating layer IL1 may be disposed on the first adhesive layer ADH1. The first insulating layer IL1 may be attached to the base layer BSL and the first and second lines IL1 and IL2 by the first adhesive layer ADH1. The first insulating layer IL1 may include an inorganic layer or an organic layer. The first insulating layer IL1 may define the rear surface BS1 of the bridge flexible circuit board B-FPC.

A second adhesive layer ADH2 may be disposed on the front surface FS1' of the base layer BSL. The second adhesive layer ADH2 may be disposed on the front surface FS1' of the base layer BSL and may cover the first and second dummy lines DLI1 and DLI2.

A second insulating layer IL2 may be disposed under the second adhesive layer ADH2. The second insulating layer IL2 may be attached to the base layer BSL and the first and second dummy lines DIL1 and DIL2 by the second adhesive layer ADH2. The second insulating layer IL2 may include an inorganic layer or an organic layer. The second insulating layer IL2 may define the front surface FS1 of the bridge flexible circuit board B-FPC.

The first and second lines LI1 and LI2 may be disposed adjacent to the rear surface BS1 of the bridge flexible circuit board B-FPC. The first and second dummy lines DLI1 and DLI2 may be disposed adjacent to the front surface FS1 of the bridge flexible circuit board B-FPC.

The number of first and second lines LI1 and LI2 and the number of first and second dummy lines DLI1 and DLI2 illustrated in FIGS. 21 and 22 are illustrative. The number of first and second lines LI1 and LI2 and the number of first and second dummy lines DLI1 and DLI2 are not necessarily limited to those illustrated in FIGS. 21 and 22.

Figure 23:
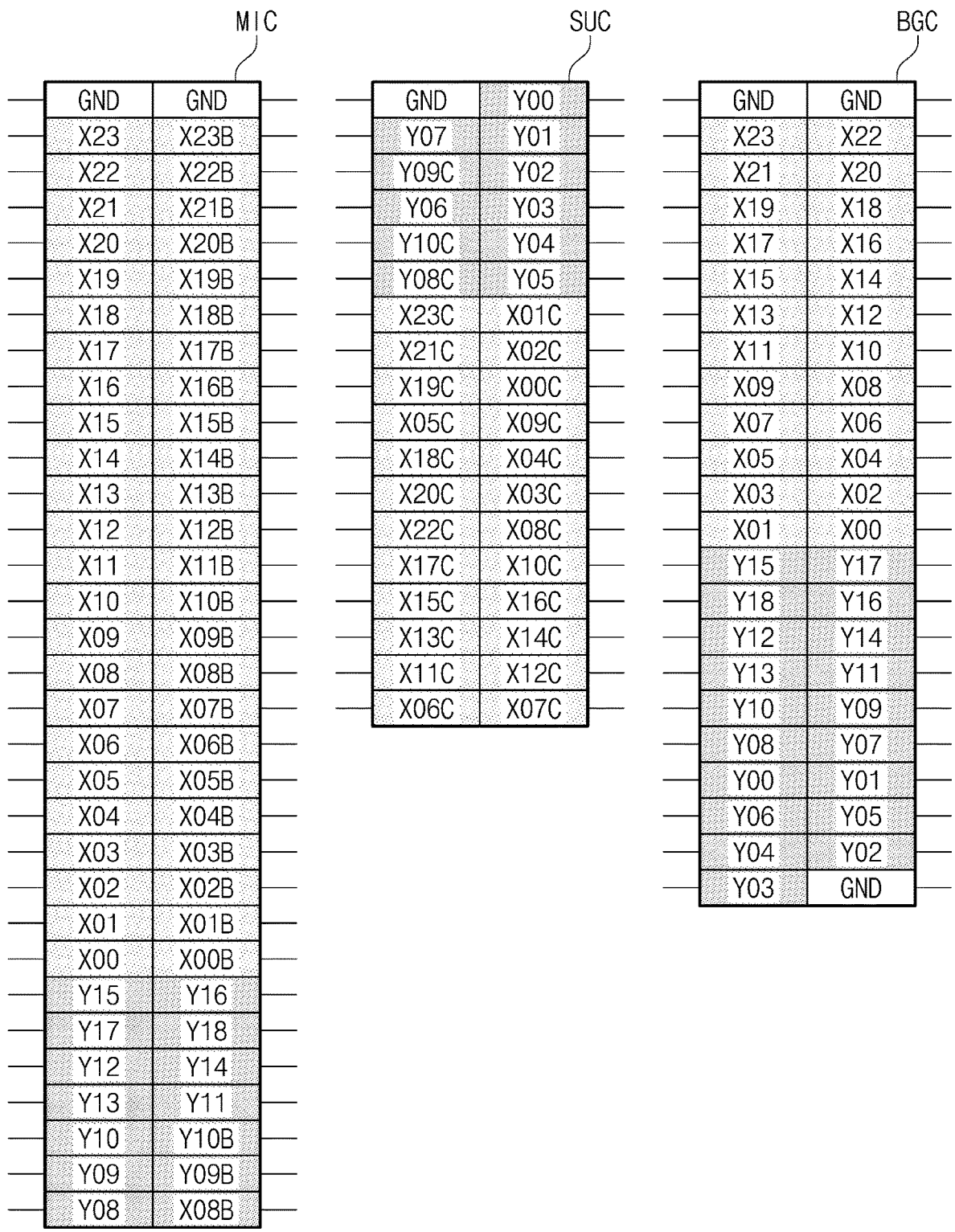
FIG. 23 is a schematic diagram illustrating pin maps for pins of a bridge connector, a main connector, and a sub-connector illustrated in FIG. 14.
Figure 24:
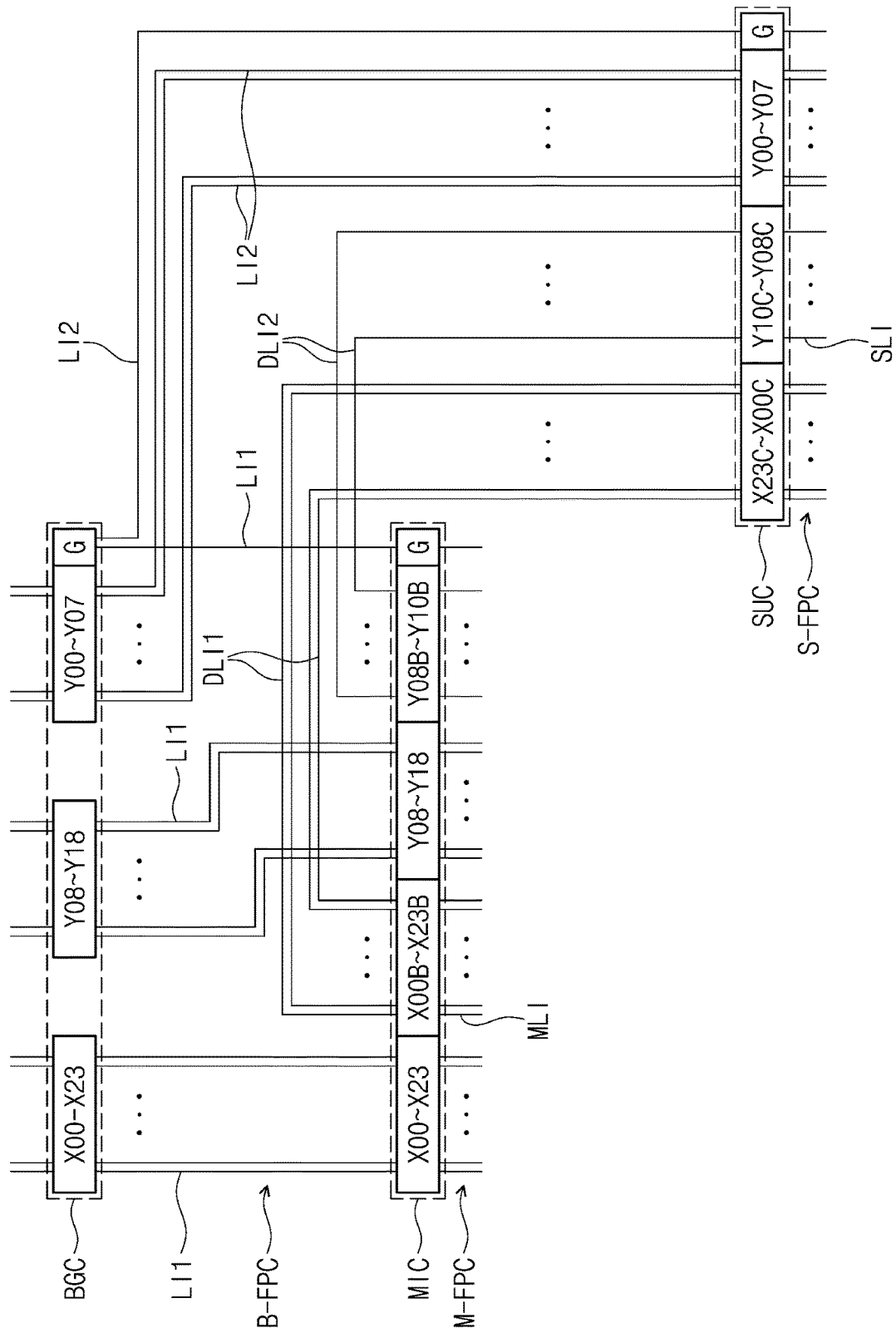
FIG. 24 is a schematic diagram illustrating a connection relationship between pins of FIG. 23 and lines illustrated in FIGS. 19 and 20.

FIG. 23 is a pin map for pins of the bridge connector, the main connector, and the sub-connector illustrated in FIG. 14. FIG. 24 is a schematic diagram illustrating a connection relationship between the pins of FIG. 23 and the lines illustrated in FIGS. 19 and 20.

Hereinafter, FIG. 19 and FIG. 20 will be described together according to the need for explanation.

Referring to FIGS. 19, 20, and 23, the main connector MIC may include a plurality of first pins X00 to X23, a plurality of sub-pins 1-1 X00B to X23B, a plurality of second pins Y08 to Y18, a plurality of sub-pins 2-1 Y08B to Y10B and a plurality of ground pins GND.

The sub-connector SUC may include a plurality of second pins Y00 to Y07, a plurality of sub-pins 1-2 X00C to X23C, a plurality of sub-pins 2-2 Y08C to Y10C, and a ground pin GND.

The bridge connector BGC may include a plurality of first pins X00 to X23, a plurality of second pins Y00 to Y18, and a plurality of ground pins GND.

In FIG. 24, for convenience of description, a single ground pin GND is illustrated in the main connector MIC, the sub-connector SUC, and the bridge connector BGC.

Referring to FIGS. 19, 20, 23, and 24, the first pins X00 to X23 of the main connector MIC may be connected to the first pins X00 to X23 of the bridge connector BGC, respectively. The first pins X00 to X23 of the main connector MIC and the first pins X00 to X23 of the bridge connector BGC may be connected by the first lines LI1, respectively.

The second pins Y08 to Y18 of the main connector MIC may be connected to the second pins Y08 to Y18 of the bridge connector BGC, respectively. The second pins Y08 to Y18 of the main connector MIC and the second pins Y08 to Y18 of the bridge connector BGC may be connected by the first lines LI1, respectively.

The sub-pins 1-1 X00B to X23B of the main connector MIC may be connected to the sub-pins 1-2 X00C to X23C of the sub-connector SUC, respectively. The sub-pins 1-1 X00B to X23B of the main connector MIC and the sub-pins 1-2 X00C to X23C of the sub-connector SUC may be connected by the first dummy lines DLI1, respectively.

The sub-pins 2-1 Y08B to Y10B of the main connector MIC may be connected to the sub-pins 2-2 Y08C to Y10C of the sub-connector SUC, respectively. The sub-pins 2-1 Y08B to Y10B of the main connector MIC and the sub-pins 2-2 Y08C to Y10C of the sub-connector SUC may be connected by the second dummy lines DLI2, respectively.

The second pins Y00 to Y07 of the sub-connector SUC may be connected to the second pins Y00 to Y07 of the bridge connector BGC, respectively. The second pins Y00 to Y07 of the sub-connector SUC and the second pins Y00 to Y07 of the bridge connector BGC may be connected by the second lines LI2, respectively.

The ground pin GND of the bridge connector BGC may be connected to the ground pin GND of the main connector MIC through the first line LI1 and may be connected to the ground pin GND of the sub-connector SUC through the second line LI2. Substantially, in FIG. 23, two ground pins GND of the bridge connector BGC may be connected to two ground pins GND of the main connector MIC. Furthermore, in FIG. 23, the remaining one ground pin GND of the bridge connector BGC may be connected to one ground pin GND of the sub-connector SUC.

Hereinafter, the second digitizer DGT2 is referred to as the main digitizer, and the first digitizer DGT1 is referred to as the sub-digitizer.

The pins X00 to X23, X00B to X23B, Y08 to Y18, and Y08B to Y10B of the main connector MIC may be connected to the main flexible circuit board M-FPC. The pins X00 to X23, X00B to X23B, Y08 to Y18, and Y08B to Y10B of the main connector MIC may be connected to the main digitizer DGT2 through the main flexible circuit board M-FPC. For example, the pins X00 to X23, X00B to X23B, Y08 to Y18, and Y08B to Y10B may be connected to lines MLI of the main flexible circuit board M-FPC, and the lines MLI of the main flexible circuit board M-FPC may be connected to the main digitizer DGT2.

The pins X00C to X23C, Y08C to Y10C, and Y00 to Y07 of the sub-connector SUC may be connected to the sub-flexible circuit board S-FPC. The pins X00C to X23C, Y08C to Y10C, and Y00 to Y07 of the sub-connector SUC may be connected to the sub-digitizer DGT1 through the sub-flexible circuit board S-FPC. For example, the pins X00C to X23C, Y08C to Y10C, and Y00 to Y07 may be connected to lines SLI of the sub-flexible circuit board S-FPC, and the lines SLI of the sub-flexible circuit board S-FPC may be connected to the sub-digitizer DGT1.

The ground pin GND of the main connector MIC may be connected to the main digitizer DGT2 through the main flexible circuit board M-FPC, and the ground pin GND of the sub-connector SUC may be connected to the sub-digitizer DGT1 through the sub-flexible circuit board S-FPC. The ground pin GND of the main connector MIC may be connected to a ground electrode of the main digitizer DGT2, and the ground pin GND of the sub-connector SUC may be connected to a ground electrode of the sub-digitizer DGT1. The ground pin GND of the bridge connector BGC may be connected to an external ground terminal.

Figure 25:
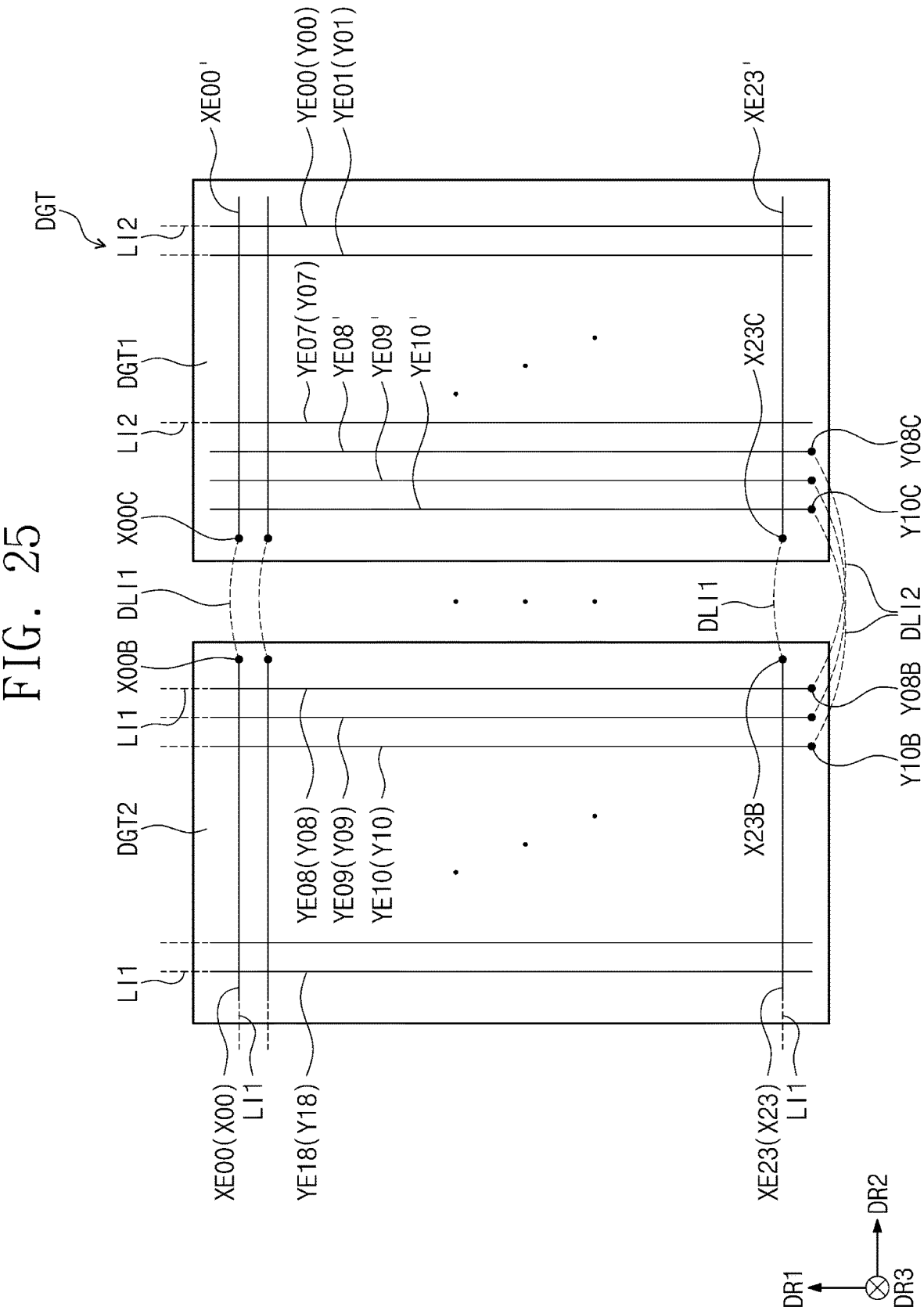
FIG. 25 is a schematic diagram illustrating a connection relationship between electrodes of a main digitizer and a sub-digitizer illustrated in FIG. 13 and pins illustrated in FIGS. 23 and 24.

FIG. 25 is a schematic diagram illustrating a connection relationship between electrodes of the main digitizer and the sub-digitizer illustrated in FIG. 13 and the pins illustrated in FIGS. 23 and 24.

Hereinafter, FIGS. 23 and 24 will be described together with FIG. 25. In FIG. 25, a planar configuration of electrodes XE00 to XE23, XE00' to XE23', YE00 to YE18, and YE08' to YE10' of the main digitizer DGT2 and the sub-digitizer DGT1 viewed from the rear is illustrated.

Referring to FIG. 25, the main digitizer DGT2 and the sub-digitizer DGT1 may include the plurality of X-axis electrodes XE00 to XE23 and XE00' to XE23' and the plurality of Y-axis electrodes YE08 to YE18, YE00 to YE07, and YE08' to YE10' insulatively crossing each other.

For example, the main digitizer DGT2 may include the plurality of first X-axis electrodes XE00 to XE23 and the plurality of first Y-axis electrodes YE08 to YE18. The sub-digitizer DGT1 may include the plurality of second X-axis electrodes XE00' to XE23' and the plurality of second Y-axis electrodes YE00 to YE07 and YE08' to YE10'.

The first X-axis electrodes XE00 to XE23 may extend in the second direction DR2 and may be arranged in the first direction DR1. The first Y-axis electrodes YE08 to YE18 may extend in the first direction DR1 and may be arranged in the second direction DR2. The first X-axis electrodes XE00 to XE23 and the first Y-axis electrodes YE08 to YE18 may insulatively cross each other.

An insulating layer may be disposed between the first X-axis electrodes XE00 to XE23 and the first Y-axis electrodes YE08 to YE18, and the first X-axis electrodes XE00 to XE23 and the first Y-axis electrodes YE08 to YE18 may be insulated from each other.

The first X-axis electrodes XE00 to XE23 and the first Y-axis electrodes YE08 to YE18 may be electrically connected through conductive VIAs formed in the insulating layer and may form a conductive loop pattern as a whole. The conductive loop pattern may generate a magnetic field within a loop in response to an input electrical signal and may thus be defined as an electro-magnetic (EMR) coil.

The second X-axis electrodes XE00' to XE23' may extend in the second direction DR2 and may be arranged in the first direction DR1. The second Y-axis electrodes YE00 to YE07 and YE08' to YE10' may extend in the first direction DR1 and may be arranged in the second direction DR2. The second X-axis electrodes XE00' to XE23' and the second Y-axis electrodes YE00 to YE07 and YE08' and YE10' may insulatively cross each other.

An insulating layer may be disposed between the second X-axis electrodes XE00' to XE23' and the second Y-axis electrodes YE00 to YE07 and YE08' to YE10', and the second X-axis electrodes XE00' to XE23' and the second Y-axis electrodes YE00 to YE07 and YE08' to YE10' may be insulated from each other.

The second X-axis electrodes XE00' to XE23' and the second Y-axis electrodes YE00 to YE07 and YE08' to YE10' may be electrically connected through conductive VIAs formed in the insulating layer and may form a conductive loop pattern as a whole. The conductive loop pattern may generate a magnetic field within a loop in response to an input electrical signal and may thus be defined as an electro-magnetic (EMR) coil.

The first X-axis electrodes XE00 to XE23 may be connected to the first lines LI1 through the first pins X00 to X23. The first Y-axis electrodes YE08 to YE18 may be connected to the first lines LI1 through the second pins Y08 to Y18.

The second Y-axis electrodes YE00 to YE07 and YE08' to YE10' may include the second-first Y-axis electrodes YE00 to YE07 and the second-second Y-axis electrodes YE08' to YE10'. The second-first Y-axis electrodes YE00 to YE07 may be connected to the second lines LI2 through the second pins Y00 to Y07.

The first X-axis electrodes XE00 to XE23 may be connected to the sub-pins 1-1 X00B to X23B. The second X-axis electrodes XE00' to XE23' may be connected to the sub-pins 1-2 X00C to X23C. For example, the sub-pins 1-1 X00B to X23B and the sub-pins 1-2 X00C to X23C may be connected to sides of the first X-axis electrodes XE00 to XE23 and sides of the second X-axis electrodes XE00' to XE23' adjacent to each other. As described above, the sub-pins 1-1 X00B to X23B and the sub-pins 1-2 X00C to X23C may be connected by the first dummy lines DLI1.

Accordingly, the first dummy lines DLI1 may connect the first X-axis electrodes XE00 to XE23 to the second X-axis electrodes XE00' to XE23'. For example, the first X-axis electrodes XE00 to XE23 of the main digitizer DGT2 may be connected to the second X-axis electrodes XE00' to XE23' of the sub-digitizer DGT1 through the bridge flexible circuit board B-FPC.

An X-axis driving signal may be applied from the above-described digitizer driver IC DG-IC to the first X-axis electrodes XE00 to XE23 through the first lines LIL The X-axis driving signal may be transmitted from the first X-axis electrodes XE00 to XE23 to the second X-axis electrodes XE00' to XE23' through the first dummy lines DLI1.

Accordingly, even though the digitizer DGT is divided into the main digitizer DGT2 and the sub-digitizer DGT1, the X-axis driving signal may be normally provided to the main digitizer DGT2 and the sub-digitizer DGT1.

Among the first Y-axis electrodes YE08 to YE18, the first Y-axis electrodes YE08 to YE10 may be connected to the sub-pins 2-1 Y08B to Y10B The second-second Y-axis electrodes YE08' to YE10' may be connected to the sub-pins 2-2 Y08C to Y10C. The sub-pins 2-1 Y08B to Y10B and the sub-pins 2-2 Y08C to Y10C may be connected to sides of the first Y-axis electrodes YE08 to YE10 and sides of the second-second Y-axis electrodes YE08' to YE10' adjacent to each other. As described above, the sub-pins 2-1 Y08B to Y10B and the sub-pins 2-2 Y08C to Y10C may be connected by the second dummy lines DLI2.

The second dummy lines DLI2 may connect the first Y-axis electrodes YE08 to YE10 to the second-second Y-axis electrodes YE08' to YE10'. For example, among the first Y-axis electrodes YE08 to YE18, the first Y-axis electrodes YE08 to YE10 may be connected to the second Y-axis electrodes YE08' to YE10' among the second Y-axis electrodes YE00 to YE07 and YE08' to YE10' through the bridge flexible circuit board B-FPC.

A Y-axis driving signal may be applied from the above-described digitizer driver IC DG-IC to the first Y-axis electrodes YE08 to YE18 and the second-first Y-axis electrodes YE00 to YE07 through the first and second lines LI1 and LI2. The Y-axis driving signal may be transmitted from the first Y-axis electrodes YE08 to YE10 to the second-second Y-axis electrodes YE08' to YE10' through the second dummy lines DLI2.

Accordingly, even though the digitizer DGT is divided into the main digitizer DGT2 and the sub-digitizer DGT1, the Y-axis driving signal may be transmitted from the Y-axis electrodes YE08 to YE10 to the Y-axis electrodes YE08' to YE10'. Accordingly, the Y-axis driving signal may be normally provided to the main digitizer DGT2 and the sub-digitizer DGT1 as if the digitizer was undivided.

The main flexible circuit board M-FPC and the sub-flexible circuit board S-FPC may be connected to the main digitizer DGT2 and the sub-digitizer DGT1, respectively, which are divided from each other, and the bridge flexible circuit board B-FPC may be connected to the main flexible circuit board M-FPC and the sub-flexible circuit board S-FPC. As described above, the electrodes of the main digitizer DGT2 and the sub-digitizer DGT1 may be connected through the bridge flexible circuit board B-FPC. The main digitizer DGT2 and the sub-digitizer DGT1 divided from each other may be connected by the bridge flexible circuit board B-FPC and may be driven together.

Two driver ICs may be used to drive the main digitizer DGT2 and the sub-digitizer DGT1 divided from each other. In this case, the two driver ICs may be connected to the main flexible circuit board M-FPC and the sub-flexible circuit board S-FPC, respectively, and may provide driving signals to the main flexible circuit board M-FPC and the sub-flexible circuit board S-FPC, respectively. As the two driver ICs are used, manufacturing cost may be increased.

In an embodiment of the present disclosure, the two driver ICS for driving the main digitizer DGT2 and the sub-digitizer DGT1 divided from each other might not be used, and the single digitizer driver IC DG-IC may be used. Accordingly, manufacturing cost may be decreased. As the bridge flexible circuit board B-FPC is connected to the main digitizer DGT2 and the sub-digitizer DGT1, the main digitizer DGT2 and the sub-digitizer DGT1 may be driven together by the single digitizer driver IC DG-IC.

According to embodiments of the present disclosure, the main flexible circuit board and the sub-flexible circuit board may be connected to the first digitizer and the second digitizer, respectively, which are divided from each other, and the bridge flexible circuit board may be connected to the main flexible circuit board and the sub-flexible circuit board. The electrodes of the first and second digitizers may be connected through the bridge flexible circuit board. Accordingly, the first and second digitizers divided from each other may be connected by the bridge flexible circuit board and may be driven together.

While the present disclosure has been described with reference to the figures, it will be apparent to those of ordinary skill in the art that various changes and modifications may be made thereto without departing from the spirit and scope of the present disclosure.

What is claimed is:

1. A display device, comprising:
a display panel;
a main digitizer and a sub-digitizer, each disposed behind the display panel;
a main flexible circuit board disposed on a rear surface of the main digitizer and electrically connected to the main digitizer;
a sub-flexible circuit board disposed on a rear surface of the sub-digitizer and electrically connected to the sub-digitizer; and
a bridge flexible circuit board disposed on both the rear surface of the main digitizer and the rear surface of the sub-digitizer and electrically connected to both the main flexible circuit board and the sub-flexible circuit board.

2. The display device of claim 1, wherein each of the main digitizer and the sub-digitizer includes a plurality of X-axis electrodes and a plurality of Y-axis electrodes crossing each other, and
wherein the X-axis electrodes of the plurality of X-axis electrodes of the main digitizer are electrically connected to the X-axis electrodes of the plurality of X-axis electrodes of the sub-digitizer through the bridge flexible circuit board.

3. The display device of claim 2, wherein some of the plurality of Y-axis electrodes of the main digitizer are electrically connected to some of the plurality of Y-axis electrodes of the sub-digitizer through the bridge flexible circuit board.

4. The display device of claim 1, wherein the bridge flexible circuit board includes:
a first extension disposed on the rear surface of the main digitizer and electrically connected to the main flexible circuit board; and
a second extension extending from one portion of the first extension onto the rear surface of the sub-digitizer, the second extension being electrically connected to the sub-flexible circuit board.

5. The display device of claim 4, wherein the display panel is folded about a folding axis that extends in a first direction, and the first extension forms a first acute angle with respect to the first direction.

6. The display device of claim 5, wherein the second extension includes:
a first sub-extension extending from the one portion of the first extension in a second direction crossing the first direction at a right angle; and
a second sub-extension extending from the first sub-extension, the second sub-extension being electrically connected to the sub-flexible circuit board,
wherein the second sub-extension forms a second acute angle that is greater than the first acute angle with respect to the first direction.

7. The display device of claim 4, further comprising:
a main connector electrically connected to one side of the first extension;
a bridge connector electrically connected to an opposite side of the first extension; and a sub-connector electrically connected to one side of the second extension,
wherein the main connector is electrically connected to the main flexible circuit board, and the sub-connector is electrically connected to the sub-flexible circuit board.

8. The display device of claim 7, further comprising:
a digitizer driver IC electrically connected to the bridge connector.

9. The display device of claim 7, wherein the bridge flexible circuit board further includes:
a plurality of first lines disposed in the first extension and electrically connected to both the bridge connector and the main connector;
a plurality of second lines disposed in both the first extension and the second extension and electrically connected to both the bridge connector and the sub-connector; and
a plurality of first and second dummy lines disposed in both the first extension and the second extension and electrically connected to the both main connector and the sub-connector.

10. The display device of claim 9, wherein the plurality of first lines is not electrically connected to the sub-connector, the plurality of second lines is not electrically connected to the main connector, and the plurality of first dummy lines and the plurality of second dummy lines are not electrically connected to the bridge connector.

11. The display device of claim 9, wherein the plurality of first lines and the plurality of second lines are disposed on a same layer as each other, the plurality of first dummy lines and the plurality of second dummy lines are disposed on a same layer as each other, and the plurality of first dummy lines and the plurality of second dummy lines are disposed on a different layer from that of the plurality of first lines and the plurality of second lines.

12. The display device of claim 9, wherein the main digitizer includes:
a plurality of first X-axis electrodes; and
a plurality of first Y-axis electrodes crossing the plurality of first X-axis electrodes,
wherein the sub-digitizer includes:
a plurality of second X-axis electrodes; and
a plurality of second Y-axis electrodes crossing the plurality of second X-axis electrodes, and
wherein the plurality of first lines is electrically connected to the plurality of first X-axis electrodes and the plurality of first Y-axis electrodes, and the plurality of second lines is electrically connected to second-first Y-axis electrodes among the plurality of second Y-axis electrodes.

13. The display device of claim 12, wherein the plurality of first dummy lines eclectically connects the plurality of first X-axis electrodes to the plurality of second X-axis electrodes.

14. The display device of claim 12, wherein the plurality of second dummy lines electrically connects some of the plurality of first Y-axis electrodes to second-second Y-axis electrodes among the plurality of second Y-axis electrodes.

15. The display device of claim 1, further comprising:
a plurality of main pads disposed on one surface of the main flexible circuit board facing the rear surface of the main digitizer; and
a plurality of first pads disposed in a first depression defined on the rear surface of the main digitizer, the plurality of first pads being electrically connected to the plurality of main pads in a one-to-one manner.

16. The display device of claim 1, further comprising:
a plurality of sub-pads disposed on one surface of the sub-flexible circuit board facing the rear surface of the sub-digitizer; and
a plurality of second pads disposed in a second depression defined on the rear surface of the sub-digitizer, the plurality of second pads being electrically connected to the plurality of sub-pads in a one-to-one manner.

17. A display device, comprising:
a display panel including a first non-folding area, a second non-folding area, and a folding area disposed between the first non-folding area and the second non-folding area;
a first digitizer disposed behind the first non-folding area;
a second digitizer disposed behind the second non-folding area; and
a bridge flexible circuit board electrically connected to both the first and second digitizers,
wherein each of the first and second digitizers includes a plurality of X-axis electrodes and a plurality of Y-axis electrodes crossing each other, and
wherein the plurality of X-axis electrodes of the second digitizer are electrically connected to the plurality of X-axis electrodes of the first digitizer through the bridge flexible circuit board.

18. The display device of claim 17, wherein some of the plurality of Y-axis electrodes of the second digitizer are electrically connected to some of the plurality of Y-axis electrodes of the first digitizer through the bridge flexible circuit board.

19. The display device of claim 17, further comprising:
a main flexible circuit board disposed on a rear surface of the second digitizer and electrically connected to both the second digitizer and the bridge flexible circuit board; and
a sub-flexible circuit board disposed on a rear surface of the first digitizer and electrically connected to both the first digitizer and the bridge flexible circuit board.

20. An electronic device, comprising:
a display device having a first hole area defined therein through which an optical signal passes;
an electro-optical module disposed behind the display device, overlapping the first hole area, and receiving the optical signal; and
a case accommodating both the display device and the electro-optical module,
wherein the display device includes:
a display panel;
a main digitizer and a sub-digitizer disposed behind the display panel;
a main flexible circuit board disposed on a rear surface of the main digitizer and electrically connected to the main digitizer;
a sub-flexible circuit board disposed on a rear surface of the sub-digitizer and electrically connected to the sub-digitizer; and
a bridge flexible circuit board disposed on both the rear surface of the main digitizer and the rear surface of the sub-digitizer and electrically connected to both the main flexible circuit board and the sub-flexible circuit board.

* * * * *